(12) United States Patent
Sudoh

(10) Patent No.: US 12,117,668 B2
(45) Date of Patent: Oct. 15, 2024

(54) PROPAGATION OPTICAL SYSTEM, VIRTUAL IMAGE DISPLAY APPARATUS, AND HEAD-MOUNTED DISPLAY

(71) Applicant: Yoshifumi Sudoh, Kanagawa (JP)

(72) Inventor: Yoshifumi Sudoh, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/943,216

(22) Filed: Sep. 13, 2022

(65) Prior Publication Data
US 2023/0088184 A1  Mar. 23, 2023

(30) Foreign Application Priority Data
Sep. 16, 2021 (JP) ................. 2021-150758

(51) Int. Cl.
| | |
|---|---|
| *G02B 9/02* | (2006.01) |
| *F21V 8/00* | (2006.01) |
| *G02B 13/18* | (2006.01) |
| *G02B 27/00* | (2006.01) |

(52) U.S. Cl.
CPC ............ *G02B 9/02* (2013.01); *G02B 6/0025* (2013.01); *G02B 6/003* (2013.01); *G02B 13/18* (2013.01); *G02B 6/0078* (2013.01); *G02B 27/0081* (2013.01)

(58) Field of Classification Search
CPC ........ G02B 2027/0178; G02B 27/0172; G02B 27/017; G02B 27/0081; G02B 13/18; G02B 6/0078; G02B 6/0003; G02B 6/0025; G02B 9/02; G02B 9/10
See application file for complete search history.

(56) References Cited

U.S. PATENT DOCUMENTS

| | | | | |
|---|---|---|---|---|
| 5,546,227 | A * | 8/1996 | Yasugaki | G02B 27/0172 359/638 |
| 6,239,915 | B1 * | 5/2001 | Takagi | G02B 27/017 359/629 |
| 9,086,569 | B1 * | 7/2015 | Cakmakci | G02B 27/0025 |
| 11,300,790 | B2 * | 4/2022 | Cheng | G02B 17/006 |
| 2002/0018185 | A1 * | 2/2002 | Kuramochi | G03B 13/08 353/69 |
| 2006/0072205 | A1 * | 4/2006 | Li | G02B 27/0172 359/630 |
| 2008/0291531 | A1 * | 11/2008 | Heimer | G02B 7/002 359/726 |
| 2009/0153969 | A1 * | 6/2009 | Saito | G02B 27/0172 359/558 |

(Continued)

FOREIGN PATENT DOCUMENTS

| | | | | |
|---|---|---|---|---|
| CN | 1313958 | A * | 9/2001 | ......... G02B 17/0816 |
| CN | 103984098 | A * | 8/2014 | ......... G02B 17/0856 |

(Continued)

*Primary Examiner* — Balram T Parbadia
*Assistant Examiner* — Mary A El-Shammaa
(74) *Attorney, Agent, or Firm* — XSENSUS LLP

(57) ABSTRACT

In a propagation optical system to propagate light from an image display element to a light guide element, the propagation optical system includes: a prism having a first surface having negative power to which light emitted from the image display element enters; and a lens group having positive power. The prism and the lens group are arranged between the image display element and the light guide element along an optical axis, and the prism is closer to the image display element than to the light guide element.

10 Claims, 15 Drawing Sheets

(56) References Cited

U.S. PATENT DOCUMENTS

| | | | |
|---|---|---|---|
| 2012/0069448 A1* | 3/2012 | Sugihara | G02B 27/0176 359/643 |
| 2013/0222896 A1* | 8/2013 | Komatsu | G02B 27/0172 359/365 |
| 2014/0247500 A1* | 9/2014 | Takeda | G02B 6/00 359/633 |
| 2018/0096471 A1* | 4/2018 | Wilson | G02B 27/0172 |
| 2018/0307041 A1* | 10/2018 | Masui | G02B 13/16 |
| 2019/0187353 A1* | 6/2019 | Kuo | G02B 3/04 |
| 2020/0142195 A1* | 5/2020 | Ide | G02B 27/0172 |
| 2020/0150405 A1* | 5/2020 | Bates | G02B 13/16 |
| 2020/0292816 A1* | 9/2020 | Liu | G02B 27/0172 |
| 2021/0033860 A1* | 2/2021 | Yamamoto | G02B 27/0081 |
| 2021/0033868 A1* | 2/2021 | Inoguchi | G02B 17/0856 |
| 2021/0063636 A1* | 3/2021 | Shin | G02B 6/0028 |
| 2021/0165221 A1 | 6/2021 | Hasegawa et al. | |
| 2022/0026716 A1 | 1/2022 | Sudoh et al. | |
| 2022/0057640 A1 | 2/2022 | Nakamura et al. | |
| 2022/0252838 A1 | 8/2022 | Sudoh et al. | |
| 2023/0019746 A1* | 1/2023 | Uhlig | G02B 27/0172 |
| 2023/0089031 A1* | 3/2023 | Huh | G02B 13/004 359/736 |
| 2023/0280595 A1* | 9/2023 | Qin | G02C 7/086 351/158 |

FOREIGN PATENT DOCUMENTS

| | | | | | |
|---|---|---|---|---|---|
| CN | 103984099 A | * | 8/2014 | | G02B 17/086 |
| CN | 104570366 A | * | 4/2015 | | G02B 27/0172 |
| CN | 106526845 A | * | 3/2017 | | G02B 27/0101 |
| CN | 111610631 A | * | 9/2020 | | G02B 25/001 |
| CN | 111929899 A | * | 11/2020 | | |
| CN | 113980849 A | * | 1/2022 | | |
| CN | 113985612 A | * | 1/2022 | | |
| CN | 114637107 A | * | 6/2022 | | G02B 27/0025 |
| CN | 109541803 B | * | 8/2023 | | G02B 13/0015 |
| JP | 2020-522024 | | 7/2020 | | |
| JP | 2022-022103 | | 2/2022 | | |
| WO | WO-0079325 A1 | * | 12/2000 | | G02B 27/0172 |
| WO | WO-2009014256 A1 | * | 1/2009 | | G02B 13/18 |
| WO | WO-2014129133 A2 | * | 8/2014 | | B32B 37/1284 |
| WO | WO-2015111420 A1 | * | 7/2015 | | G02B 27/0081 |
| WO | WO-2015114691 A1 | * | 8/2015 | | G02B 27/0018 |
| WO | WO-2016132974 A1 | * | 8/2016 | | G02B 27/0172 |
| WO | WO-2016160099 A2 | * | 10/2016 | | G02B 17/0816 |
| WO | WO-2017181360 A1 | * | 10/2017 | | G02B 13/0035 |
| WO | WO2018/220265 A1 | | 12/2018 | | |
| WO | WO-2020095652 A1 | * | 5/2020 | | G02B 13/18 |
| WO | WO-2020255562 A1 | * | 12/2020 | | G02B 26/0816 |

* cited by examiner

PROPAGATION OPTICAL SYSTEM, VIRTUAL IMAGE DISPLAY APPARATUS, AND HEAD-MOUNTED DISPLAY

CROSS-REFERENCE TO RELATED APPLICATIONS

This patent application is based on and claims priority pursuant to 35 U.S.C. § 119(a) to Japanese Patent Application No. 2021-150758, filed on Sep. 16, 2021, in the Japan Patent Office, the entire disclosure of which is incorporated by reference herein.

BACKGROUND

Technical Field

The present disclosure relates to a propagation optical system, a virtual image display apparatus, and a head-mounted display.

Related Art

A virtual image display apparatus that enlarges a two-dimensional image and displays the enlarged virtual image so as to be recognized by a user is known. For example, the virtual image display apparatus using a light guide element is known.

The virtual image display apparatus using a light guide element is configured to propagate light emitted from each pixel of an image display element (herein, the light is referred to as "image light") to the light guide element through the propagation optical system, guides the image light propagated through the propagation optical system, and emits the image light toward a user so that the user can recognize the image light as an enlarged virtual image.

The propagation optical system may include a prism that bends the propagation direction of the image light from an image display element.

SUMMARY

In a propagation optical system to propagate light from an image display element to a light guide element, the propagation optical system includes: a prism having a first surface having negative power to which light emitted from the image display element enters; and a lens group having positive power. The prism and the lens group are arranged between the image display element and the light guide element along an optical axis, and the prism is closer to the image display than to the light guide element.

A virtual image display apparatus includes: the propagation optical system to propagate light emitted from an image display element to a light guide element; the image display element to emit light as an image; and the light guide element to guide the light propagated through the propagation optical system and emit the light as a virtual image.

A head-mounted display includes the virtual image display apparatus.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
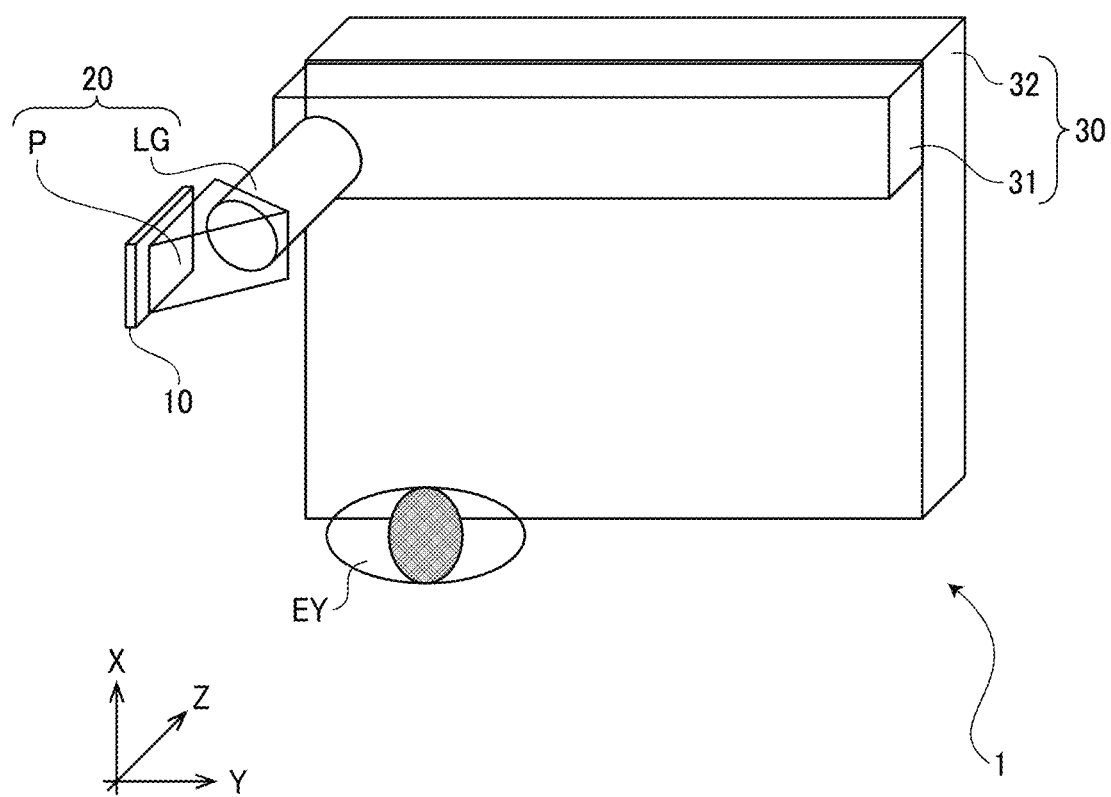
FIG. 1 is a diagram of a head-mounted display as an example of a virtual image display apparatus worn by a user according to an embodiment of the present invention.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Referring now to the drawings, embodiments of the present disclosure are described below. As used herein, the singular forms "a," "an," and "the" are intended to include the plural forms as well, unless the context clearly indicates otherwise.

According to an embodiment of the present invention, a propagation optical system that can be compact, and a virtual image display apparatus and a head-mounted display that include such a propagation optical system are provided.

A propagation optical system, a virtual image display apparatus, and a head-mounted display according to an embodiment of the present invention will be described with reference to the drawings. In the following description, common or corresponding elements are denoted by the same or similar reference signs, and redundant description is appropriately simplified or omitted.

FIG. 1 is a diagram of a head-mounted display as an example of a virtual image display apparatus worn by a user. In FIG. 1, the left eye EY of the user is illustrated.

As illustrated in FIG. 1, the head-mounted display 1 includes an image display element 10, a propagation optical system 20, and a light guide element 30. Image light (i.e., light containing information on an image) emitted from the image display element 10 propagates through the propagation optical system 20 to the light guide element 30. The image light further propagates through the light guide element 30 and exit the light guide element 30 to display an virtual image. The image display element 10, the propagation optical system 20, and the light guide element 30 constitutes the virtual image display apparatus using the light guide.

The head-mounted display 1 allows the user to observe a virtual image with a wide angle of view. In order to secure a wide angle of view, the diameter of the propagation optical system 20 may be increased. However, the size of the diameter of the propagation optical system 20 is limited because the user wears the head-mounted display and there is a suitable size of the heard-mounted display for the user. The propagation optical system 20 having a greater diameter is limited by the restriction on the suitable sizes of the head-mounted display to be worn by a human. For example, in the case of smart glasses, the propagation optical system 20 is built into a temple of the smart glasses. When the diameter of the propagation optical system 20 is increased and the temple is thickened, the user has a difficulty in wearing a smart glass due to an increase in size or the burden due to an increase in weight.

In the propagation optical system 20 according to the present embodiment, an increase in the size of the propagation optical system 20 due to a wider angle of view is reduced. In other words, the propagation optical system 20 is configured to be compact while ensuring a wide angle of view.

In the following description, a first horizontal direction in which the image display element 10 and the propagation optical system 20 are arranged is defined as a Z-direction, a second horizontal direction orthogonal to the Z-direction is defined as a Y-direction, and a vertical direction orthogonal to both of the Y-direction and the Z-direction is defined as an X-direction. In the drawings, the X-direction, the Y-direction, and the Z-direction orthogonal to each other form a right-handed system. Herein, the term "direction" is used to describe the relative position of the components for the sake of convenience, and does not indicate an absolute direction. Depending on the posture of the user wearing the head-mounted display 1, for example, the Z-direction may not be the horizontal direction and may be the vertical direction.

Figure 2A:
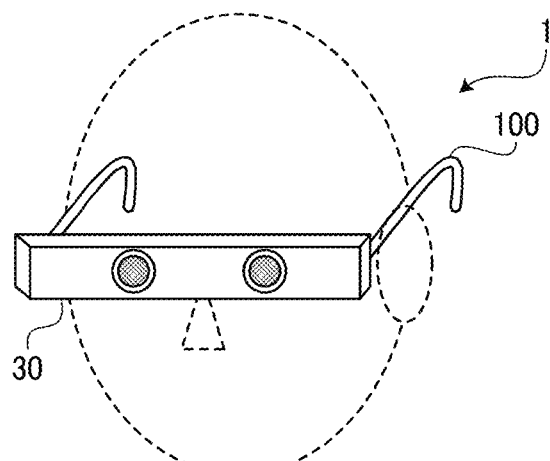
FIG. 2A is a diagram of a head-mounted display worn by a user according to an embodiment of the present invention.
Figure 2B:
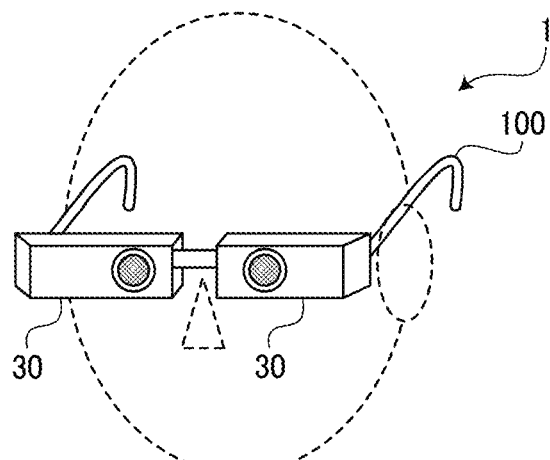
FIG. 2B is a diagram of a head-mounted display worn by a user according to another embodiment of the present invention.
Figure 2C:
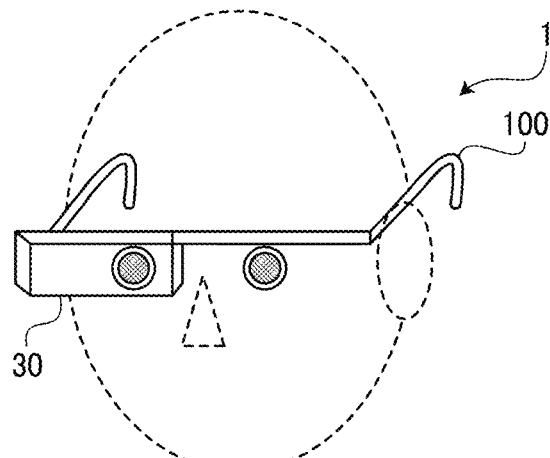
FIG. 2C is a diagram of a head-mounted display worn by a user according to still another embodiment of the present invention.

FIGS. 2A to 2C are diagrams of the head-mounted display 1 worn by the user. The head-mounted display 1 illustrated in FIGS. 2A to 2C may be referred to as smart glasses.

The head-mounted display 1 illustrated in FIG. 2A is a binocular head-mounted display, and has a configuration in which a single light guide element 30 having a length corresponding to the face width of the user is fixed to a frame 100. The light guide element 30 forms an eye box in a region including both left and right eyes. The image display element 10 and the propagation optical system 20 (FIG. 1) are built in, for example, the temple of the frame 100. In addition, the frame 100 may have a shape that covers both ends of the light guide element 30 or an upper edge and a lower edge of the light guide element 30.

The head-mounted display 1 illustrated in FIG. 2B is also a binocular head-mounted display, and has a configuration in which a pair of head-mounted displays corresponding to the left and right eyes are fixed to the frames 100. The light guide element 30 corresponding to the right eye forms an eye box in a region including the right eye. The other light guide element 30 corresponding to the left eye forms an eye box in a region including the left eye.

The head-mounted display 1 illustrated in FIG. 2C is a monocular head-mounted display, and has a configuration in which a single head-mounted display corresponding to the right eye is fixed to the frame 100. A monocular head-mounted display in which a single head-mounted display corresponding to the left eye is fixed to the frame 100 is also within the scope of the present invention.

The propagation optical system 20 according to the present embodiment is not limited to a head-mounted display, and can also be applied to other virtual image display apparatuses other than the head-mounted displays. Said other virtual image display apparatuses include, for example, a head-up display.

Each component included in the head-mounted display 1 will be specifically described.

The image display element 10 displays an image to be recognized as a virtual image, and is, for example, an organic light emitting diode (OLED) array, a laser diode (LD) array, a light emitting diode (LED) array, microelectro-mechanical systems (MEMS), or a digital micromirror device (DMD). When the image display element 10 is configured by an OLED array, the size of an image display area (i.e., effective pixel region) is, for example, 3 mm×4 mm, and the number of pixels is, for example, about 10,000 pixels.

The image light emitted from the image display element 10 enters the propagation optical system 20.

Figure 3:
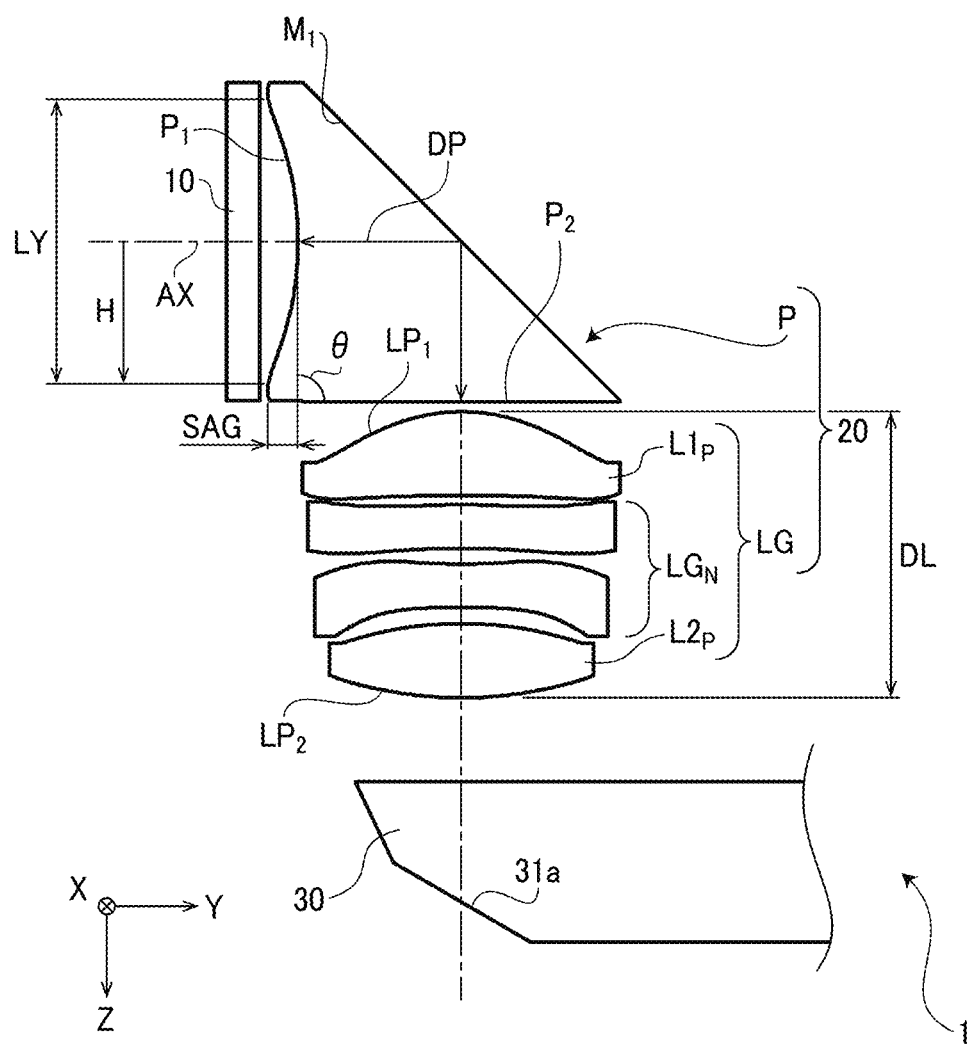
FIG. 3 is a diagram of a configuration of a propagation optical system according to an embodiment (Numerical Example 1)

FIG. 3 is a diagram of an optical configuration of a propagation optical system 20. As illustrated in FIG. 3, the propagation optical system 20 includes a prism P and a lens group LG arranged in this order from the image display element 10 to the light guide element 30 (i.e., between the image display element 10 and the light guide element 30 along the optical axis AX). The lens group LG has a rotational symmetry with respect to the optical axis AX and has a positive power.

Herein, the expression "arranged" in the present embodiment does not exclude a configuration in which another optical element is added to the propagation optical system 20 within the scope of the technical idea of the present invention. Such a configuration having another optical element includes a configuration in which a parallel flat plate that does not substantially contribute to the optical performance of the propagation optical system 20 is added, or a configuration in which another optical element is added while maintaining the configuration and the performance of the propagation optical system 20 according to the present embodiment. Thus, a configuration in which an optical element such as the parallel-flat plate described above is added to the propagation optical system 20 including the prism P and the lens group LG is also within the scope of the present invention.

For example, smart glasses in which an image display element and a light guide element are integrated is known. In such smart glasses, most of the weight is concentrated on the lens portion. Thus, a heavier load is applied to the nose of the user during wearing the smart glasses, and the user has a difficulty in wearing the smart glasses for a long time.

By contrast, the smart glasses using the light guide element has a configuration in which the image display element and the light guide element are physically separated from each other by disposing a propagation optical system between the image display element and the light guide element (i.e., in the temple of the smart glasses). In the smart glasses using light guide member, the image display element is incorporated in, for example, a temple (more specifically, in the vicinity of the temple of the smart glasses). Thus, the load applied to the user is distributed to three points of the nose and both ears, and the user may wear the smart glasses for a long time without a difficulty.

In the propagation optical system, a wide angle of view is to be secured, and the size of the propagation optical system is to be reduced because the propagation optical system is built in the temple of the smart glasses. In addition, the burden on the user wearing the smart glasses is to be reduced by reducing the weight with a reduction in the size of the propagation optical system.

In addition, as the image display element which is a heat generation source is disposed closer to the face of the user (e.g., the temple of the user), the user may feel more discomfort due to the heat generated by the image display element. In the propagation optical system, the image display element is disposed at a position away from the face of the user.

To avoid such circumstances, in the propagation optical system 20 according to the present embodiment, a configuration in which the face of the user is away from the image display element, a preferable optical performance (e.g., a wide angle of view, or preferable correction of aberration) is achieved, and the size is reduced.

Specifically, the prism P provided in the propagation optical system 20 bends the propagation direction of the image light emitted from the image display element 10. The image display element 10 is disposed at a position away from the face of the user by disposing the prism P. The heat generated by the image display element 10 is less likely to be transmitted to the user by disposing the image display element 10 at a position away from the face of the user. In the configuration in which the prism P is disposed after the image display element 10 along the optical axis AX (i.e., the prism P is between the image display element 10 and the lens group LG along the optical axis AX), the size of the propagation optical system 20 is reduced as compared to a configuration in which the prism P is disposed before the light guide element 30 along the optical axis AX (i.e., the prism P is between the lens group LG and the light guide element 30).

The first surface $P_1$ of the prism P has negative power. More specifically, the first surface $P_1$ is a concave surface. The first surface $P_1$ is an optical surface of the prism P on which image light emitted from the image display element 10 enters.

Since the first surface $P_1$ has negative power, the propagation optical system 20 acquires (captures) the image light having a wide angle of view while being reduced in size. In addition, a portion of off-axis light among the image light emitted from the image display element 10 passes through a part of the first surface $P_1$ away from the optical axes AX. Thus, by determining the shape of the surface having negative power (i.e., the first surface $P_1$) in consideration of the off-axis aberration generated in the lens group LG disposed after the prism P along the optical axis AX, the off-axis aberration is reduced in the entire propagation optical system 20.

The image light passed through the first surface $P_1$ is reflected and deflected by the reflection surface $M_1$ of the prism P and is emitted from the second surface $P_2$ of the prism P. The second surface $P_2$ is an optical surface of the prism P from which the image light entered through the first surface $P_1$ after emitted from the image display element 10 is emitted. In other words, the prism has a second surface from which the light emitted from the image display element and entered the first surface exits. The image light emitted from the second surface $P_2$ passes through the lens group LG and enters the light guide element 30. The reflection surface $M_1$ may be a flat surface or a free-form surface.

Figure 4:
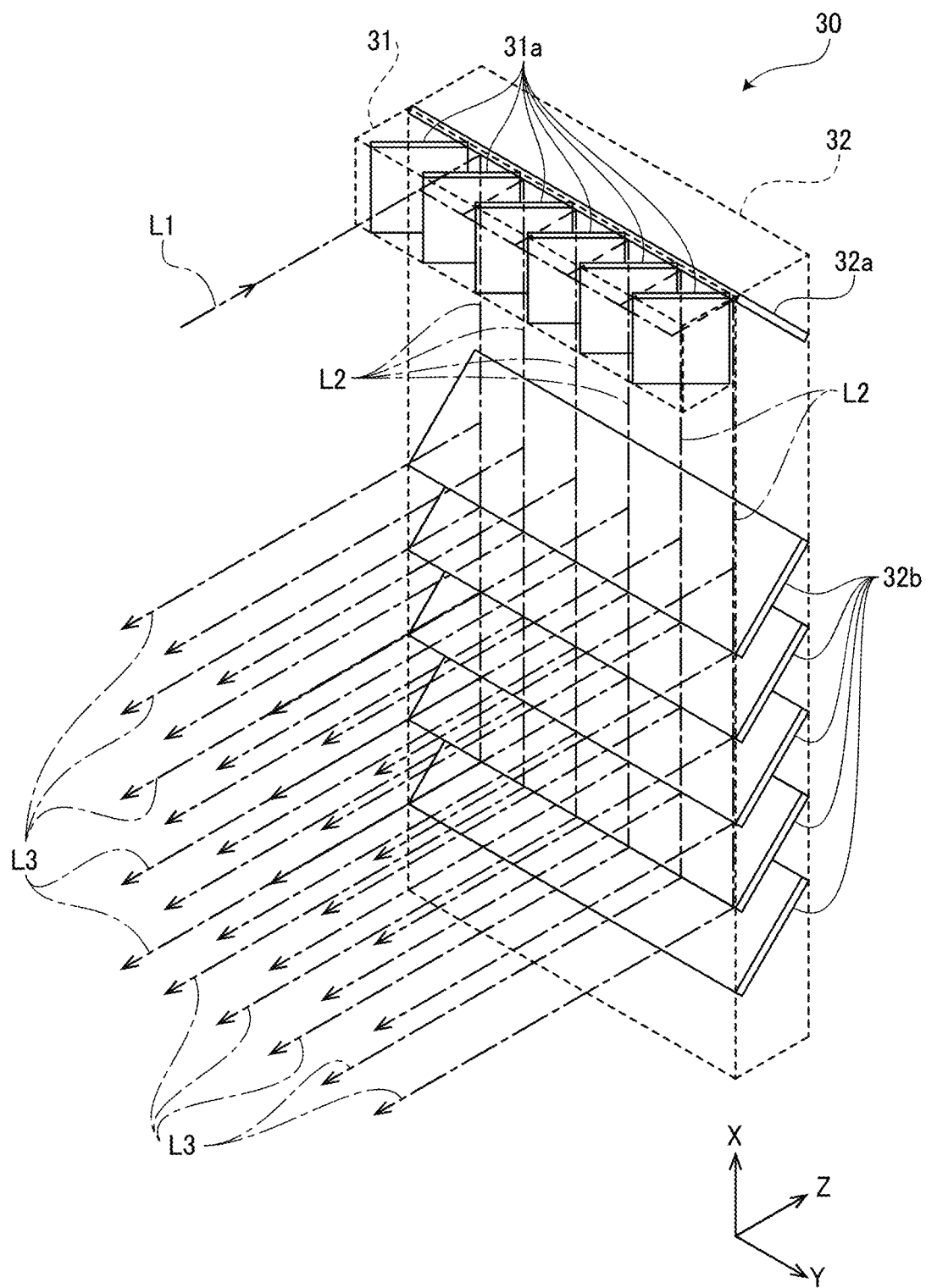
FIG. 4 is a perspective view of a configuration of a light guide element according to an embodiment of the present invention.

FIG. 4 is a perspective view of a configuration of the light guide element 30. As illustrated in FIG. 4, the light guide element 30 includes a first light guide element 31 and a second light guide element 32.

In FIG. 4, the image light L1 propagated through the propagation optical system 20 enters the first light guide element 31.

Inside the first light guide element 31, multiple first mirrors 31a are arranged in the Y-direction. The image light L1 propagated through the propagation optical system 20 strikes the first mirror 31a disposed closest to the end of first light guide element 31 in the negative Y-direction (closest to the negative side of the first light guide element 31 along the Y-axis) among the multiple first mirrors 31a. In FIG. 4, six first mirrors 31a are illustrated for the sake of convenience. However, the number of first mirrors 31a is actually more than six.

The first mirrors 31a have a coating having specific reflectivity and transmissivity to reflect a portion of the image light L1 that has entered the first mirror 31a and transmit a portion of the image light L1 that has entered the first mirror 31a. The image light L1 that has entered the first light guide element 31 is distributed (divided) into reflection light and transmission light at each first mirror 31a. After repeated distribution of the image light L1 into reflected light and transmitted light, the image light L1 spreads in the Y-direction (i.e., image light L2).

The image light L2 enters the second light guide element 32. A second mirror 32a and multiple third mirrors 32b are disposed inside the second light guide element 32. The multiple third mirrors 32b are arranged side by side in the X-direction.

The second mirror 32a reflects the image light L2 entered from the first light guide element 31 in the negative X-direction. Accordingly, the image light L2 is guided through the second light guide element 32 in the negative X-direction and enters the third mirror 32b.

Like the first mirror 31a, the third mirror 32b has a coating having specific reflectivity and transmissivity, and reflects a portion of the image light L2 that enters the third mirror 32b and transmits a portion of the image light L2 that enters the third mirror 32b.

The image light L2 reflected by the second mirror 32a is distributed by reflection and transmission by each third mirror 32b. By repeating distribution of the image light L2 by reflection and transmission, the image light L2 spreads in the X-direction in addition to the Y-direction (i.e., image light L3) and is emitted from the second light guide element 32 to the outside, specifically, toward the eye EY of the user. In FIG. 4, five third mirrors 32b are illustrated for the sake of convenience. However, the number of third mirrors 32b is actually more than five.

As described above, the image light L3 spreads the x-direction and the Y-direction (i.e., in two-dimensional directions). In FIG. 4, a portion of the image light L3 is illustrated in order to clarify the drawings.

When the image light L3 enters the eye EY (FIG. 1), the image light L3 forms a conjugate image of a virtual image on the retina of the eye. Thus, the user recognizes an enlarged virtual image of the image displayed on the image display element 10.

As described above, the light guide element 30 expands an eye box (i.e., a range in which a virtual image is recognized) in two-dimensional directions of the X-direction and the Y-direction.

A specific configuration of the propagation optical system 20 (FIG. 3) according to the present embodiment will be further described.

The first surface $P_1$ of the prism P may be an aspherical surface. By using an aspherical surface as the first surface $P_1$, an off-axis aberration is corrected while enabling a wider angle of view.

The propagation optical system 20 may satisfy the conditional expression (1) below:

$$-0.4 < SAG/H < -0.05 \quad (1)$$

where H is an effective height (i.e., an effective radius) of the first surface $P_1$ and SAG is the amount of the sag of the first surface $P_1$ having the effective height. Herein, the SAG is a negative value when the first surface is a concave mirror.

Since the propagation optical system 20 satisfies the conditional expression (1), both enabling a wider angle of view and reducing the size of the propagation optical system 20 are achieved, and the off-axis aberration is corrected.

In the image display element 10, the intensity of light emitted from each pixel arranged in the effective pixel region in the front direction (i.e., in the vertical direction) is maximum, and the intensity of the light decreases with an increasing angle of the light emitted from the vertical direction. When SAG/H in the conditional expression (1) is smaller than −0.4 (i.e., lower limit), particularly, the prism P has a difficulty in acquiring higher-intensity light emitted from the peripheral region of the effective pixel region in the vertical direction. Thus, the amount of light emitted from the peripheral region is difficult to obtain. When SAG/H in the conditional expression (1) is equal to or greater than −0.05 (i.e., upper limit), the first surface $P_1$ has an approximately flat surface. Thus, both securing a wide angle of view and reducing the size of the propagation optical system 20 are hard to achieve, and the off-axis aberration is hard to correct.

In order to secure a wide angle of view, reduce the size of the propagation optical system 20, and correct the off-axis aberration, preferably, the propagation optical system 20 may satisfy the conditional expression (2) below:

$$-0.3 < SAG/H < 0.1 \quad (2).$$

The propagation optical system 20 may satisfy the conditional expression (3) below:

$$1.0 < DP/LY < 2.0 \quad (3)$$

where DP is a distance along the optical axis AX from the first surface $P_1$ to the second surface $P_2$ of the prism P, and LY is the longer side or a diagonal of the effective pixel region of the image display element 10. In other word, DP is a distance between the first surface and the second surface along an optical axis AX, and LY is a length of the longest side of an effective pixel area of the image display element 10.

Herein, the effective pixel region of the image display element 10 has a rectangular shape, and has the shorter side in the vertical direction (X-direction) and the longer side in the horizontal direction (Z-direction). Thus, the length LY is the length of the effective pixel region in the z-direction.

When the propagation optical system 20 satisfies the conditional expression (3), both securing of a wider angle of view and reducing the size of the propagation optical system 20 are achieved.

When DP/LY in the conditional expression (3) is equal to or smaller than 1.0 (i.e., lower limit), the prism P becomes smaller, and thus the prism P has a difficulty in acquiring light emitted from pixels in the peripheral region in the effective pixel region of the image display element 10. Thus, the light emitted from the pixels in the peripheral region of the effective pixel region is hard to propagate to the light guide element 30. When DP/LY in the conditional expression (3) is equal to or greater than 2.0 (i.e., upper limit), the prism P becomes larger, and thus, the size of the propagation optical system 20 has a difficulty in reducing its size.

The propagation optical system 20 may satisfy the conditional expression (4) below:

$$0.5 < DP/DL < 2.0 \quad (4)$$

where DL is a distance along the optical axis AX between a lens surface $LP_1$ closest to the image display element 10 and a lens surface $LP_2$ closest to the light guide element 30 among the lens surfaces included in the lens group LG.

When the propagation optical system 20 satisfies the conditional expression (4), the propagation optical system 20 has an advantage of correcting various aberrations.

When DP/DL in the conditional expression (4) is equal to or smaller than 0.5 (lower limit), the distance DP from the first surface $P_1$ to the second surface $P_2$ of the prism P becomes short. As a result, light emitted from the pixels in the peripheral regions of the effective pixel region of the image display element 10 is hard to propagate to the light guide element 30. When DP/DL in the conditional expression (4) is equal to or greater than 2.0 (upper limit), the total length of the lens group LG becomes short. As a result, various aberrations are hard to correct. For example, when the total length of the lens group LG is reduced, the intervals between the lenses among the lens group LG is also reduced. As a result, the power for the lens surface of each lens increases. As the power of the lens surface increases, various aberrations arising on each surface also increase. Thus, the aberration arising in the entire lens unit LG is hard to correct.

In order to correct various aberrations more effectively, the propagation optical system 20 may satisfy the conditional expression (5) below:

$$0.5 < DP/DL < 1.5 \quad (5).$$

The lens group LG may include a first positive lens $L1_P$ having positive power, a negative lens group $LG_N$ having at least one lens and having negative power, and a second positive lens $L2_P$ having positive power in order from the image display element 10 to the light guide element 30. The negative lens group $LG_N$ includes, for example, one lens or two lenses.

By arranging lenses or lens groups having positive, negative, and positive in the power in this order from the image display element 10 to the light guide element 30, various aberrations are preferably corrected. In addition, a chromatic aberration is more preferably corrected by using the first positive lens L1$_P$ or the second positive lens L2$_P$ of a material having an Abbe number larger than an Abbe number of the negative lens included in the negative lens group LG$_N$, The propagation optical system 20 may satisfy the conditional expression (6) below:

$$-2.0 < fn/f1 < -0.3 \quad (6)$$

where fn is the focal length of the negative lens group LG$_N$ and f1 is the focal length of the first positive lens.

Various aberrations are corrected more preferably by satisfying the conditional expression (6).

When fn/f1 in the conditional expression (6) is equal to or smaller than −2.0 (lower limit), the focal length fn of the negative lens group LG$_N$ becomes long. As a result, the correction of the aberration arising in the first positive lens L1$_P$ by the negative lens group LG$_N$ becomes under (under-correction or under-corrected), and various aberrations are not sufficiently corrected. When fn/f1 in the conditional expression (6) is equal to or greater than −0.3 (upper limit), the focal length fn of the negative lens group LG$_N$ becomes short. As a result, the correction of the aberration arising in the first positive lens L1$_P$ by the negative lens group LG$_N$ is over (over-correction or over-corrected), and various aberrations are not sufficiently corrected.

In order to correct various aberrations more preferably, the propagation optical system 20 may satisfy the conditional expression (7) below:

$$-1.8 < fn/f1 < -0.5. \quad (7)$$

The propagation optical system 20 may satisfy the conditional expression (8) below:

$$-2.0 < fn/f2 < -0.3 \quad (8)$$

where f2 is the focal length of the second positive lens L2$_P$.

Various aberrations are corrected more preferably by satisfying the conditional expression (8).

When fn/f2 in the conditional expression (8) is equal to or smaller than −2.0 (i.e., lower limit), the focal length fn of the negative lens group LG$_N$ becomes long. As a result, the correction of the aberration arising in the second positive lens L2$_P$ by the negative lens group LG$_N$ becomes under (under-correction or under-corrected), and various aberrations are sufficiently corrected. When fn/f2 in the conditional expression (6) is equal to or greater than −0.3 (i.e., upper limit), the focal length fn of the negative lens group LG$_N$ becomes short. As a result, the correction of aberration arising in the second positive lens L2$_P$ becomes over (over-correction or over-corrected), and various aberrations are not sufficiently corrected.

In order to correct various aberrations more preferably, the propagation optical system 20 may satisfy the conditional expression (9) below:

$$-1.8 < fn/f2 < -0.4. \quad (9)$$

The propagation optical system 20 may satisfy the conditional expression (10) below:

$$70° < \theta < 110° \quad (10)$$

where θ is an angle formed by the first surface P$_1$ and the second surface P$_2$ of the prism P. When the second surface P$_2$ is a spherical surface or an aspherical surface instead of a plane surface, the angle θ is formed by a tangential plane at a vertex of the first surface P$_1$ in the optical axis AX and a tangential plane at a vertex of the second surface P$_2$ in the optical axis AX (see Numeral Example 4 below and FIG. 13)

The size of the propagation optical system 20 is further reduced by satisfying the conditional expression (10).

In a case where the angle θ is equal to or smaller than 70° (i.e., lower limit) in the conditional expression (10), since a portion of the light deflected at a part, which is farthest from the image display element 10, on the reflection surface M$_1$ of the prism P is emitted from the second surface P$_2$, the reflection surface M$_1$ and the second surface P$_2$ extend toward the image display element 10. As a result, the prism P becomes larger. The propagation optical system 20 has a difficulty in reducing the size. In a case where the angle θ is equal to or greater than 110° (i.e., upper limit) in the conditional expression (10), since a portion of the light deflected at a part, which is closest to the image display element 10, on the reflection surface M$_1$ of the prism P is emitted from the second surface P$_2$ without interfering with the first surface P$_1$, the reflection surface M$_1$ is disposed away from the image display element 10 and the second surface P$_2$ extends toward the image display element 10. As a result, the prism P becomes larger. The propagation optical system 20 has a difficulty in reducing the size.

Specific Numerical Examples 1 to 4 of the propagation optical system 20 will be described. Common matters of Numerical Examples 1 to 4 are as follows.

Common to Numerical Examples 1 to 4
  Effective pixel region of the image display element 10 having a rectangular shape with 3 mm on the shorter side (X-direction) and 5 mm on the longer side (Z-direction) in the effective pixel region
  Eye relief: 15 mm
Aberration Diagram
  Calculation in the case of forming an image with an ideal lens having a focal length of 17 mm
  Diagonal angle of view of virtual image of 40.4 degrees Numerical Example 1

FIG. 3 is a diagram of an optical configuration of the propagation optical system 20 according to Numerical Example 1 of the present invention. As illustrated in FIG. 3, the propagation optical system 20 according to Numerical Example 1 includes a prism P and a lens group LG arranged in this order from the image display element 10. The lens group LG includes a first positive lens L1$_P$, a negative lens group LG$_N$ having negative power, and a second positive lens L2$_P$ having positive power in order from the image display element 10. In Numerical Example 1, the negative lens unit LG$_N$ includes two lenses.

A specific numerical configuration of the propagation optical system 20 according to Numerical Example 1 is listed in Table 1. The numbers in Table 1 are assigned to the respective surfaces of the image display element 10, the propagation optical system 20, and the light guide element 30 in order from the image display element 10. Herein, a number 0 in Table 1 indicates an image display surface (i.e., pixel array surface) of the image display element 10. Numbers 1 and 2 in Table 1 indicate surfaces of a cover glass included in the image display element 10. The cover glass is a glass plate that covers the image display surface of the image display element 10. In FIGS. 3, 7, 10, and 13, the cover glass represents the image display element 10. Numbers 3 to 6 in Table 1 indicate surfaces of the prisms P. Numbers 7 to 14 in Table 1 indicate surfaces of the lens groups LG. Numbers 15 to 17 in Table 1 indicate surfaces of the light guide elements 30. In Table 1, R (unit: mm) represents the radius of curvature of each surface of the optical element, D (unit: mm) represents the thickness of the optical element or the interval between the optical elements, Nd represents the refraction index of the d line (wavelength: 587.56 nm), and νd represents the Abbe number of the d line. In the most right column of in the Table 1, the product name and manufacturer of the material of the optical element are denoted.

TABLE 1

| | R | D | Nd | νd | | |
|---|---|---|---|---|---|---|
| 0 | | 0.00 | | | | |
| 1 | ∞ | 0.70 | 1.51633 | 64.14 | | S-BSL7 (OHARA) |
| 2 | ∞ | 0.79 | | | | |
| 3* | −7.950 | 0.07 | 1.53100 | 56 | | E48R<ZEON> |
| 4 | ∞ | 3.33 | 1.53100 | 56 | | E48R<ZEON> |
| 5 | ∞ | −3.33 | 1.53100 | 56 | reflection surface | E48R<ZEON> |
| 6 | ∞ | −0.20 | | | | |
| 7* | −3.678 | −1.74 | 1.53100 | 56 | | E48R<ZEON> |
| 8* | −27.848 | −0.20 | | | | |
| 9* | −27.603 | −0.90 | 1.63200 | 23 | | OKP4HT(Osaka Gas Chemicals) |
| 10* | −17.545 | −0.33 | | | | |
| 11* | 9.074 | −0.90 | 1.63200 | 23 | | OKP4HT(Osaka Gas Chemicals) |
| 12* | −49.247 | −0.34 | | | | |
| 13* | −9.048 | −1.53 | 1.53100 | 56 | | E48R<ZEON> |
| 14* | 8.255 | −1.75 | | | | |
| 15 | ∞ | −2.50 | 1.53100 | 56 | | E48R<ZEON> |
| 16 | ∞ | 40.00 | 1.53100 | 56 | reflection surface | E48R<ZEON> |
| 17 | ∞ | | | | | |

In Table 1, the surfaces marked with "*" represent aspherical surfaces. Table 2 is a list of data of each aspherical surface. In Table 2, the capital letter "E" represents a power in which 10 is the base and the number on the right of E is an exponent (e.g., −7.22500E-3 is $-7.22500 \times 10^{-3}$). The radius of curvature R of the aspherical surface is expressed by a radius of curvature (paraxial curvature radius) in the optical axis AX. The shape of the aspherical surface is expressed by the equation below:

$$Z = Ch^2/\{1+\sqrt{(1-(1+K)C^2h^2)}\} + A^4 \cdot h^4 + A^6 \cdot h^6 + A^8 \cdot h^8 + A^{10} \cdot h^{10})$$

where the amount of sag is Z, the paraxial radius of curvature (1/R) is C, the height from the optical axis is h (unit: mm), the conic coefficient is K, and the fourth or higher order aspherical surface coefficients are A4, A6, A8, and A10.

The description format of the table is the same in the following Numerical Examples 2 to 4.

Figure 5:
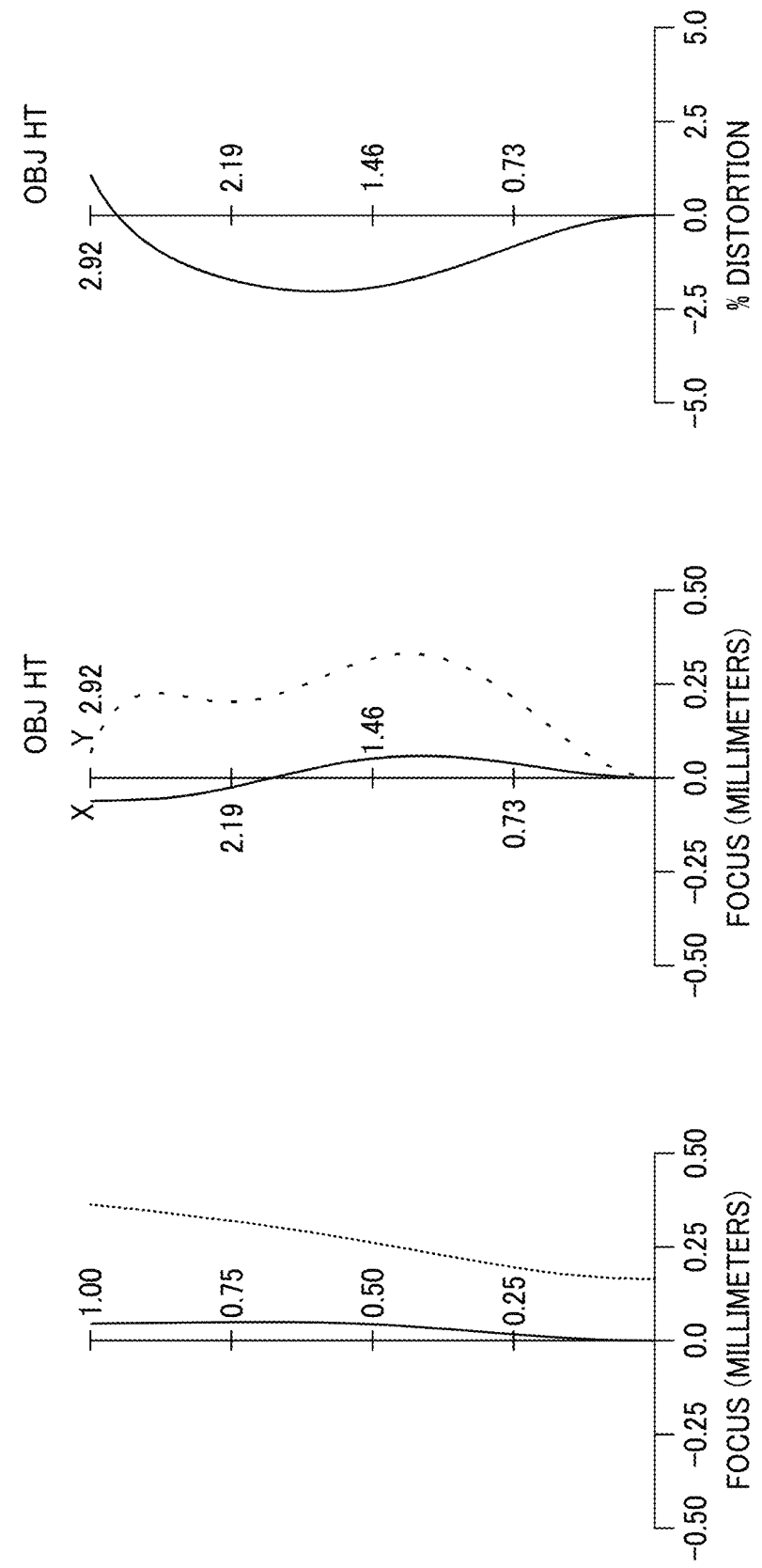
FIG. 5 is a set of aberration diagrams of spherical aberration, astigmatism, and distortion of the propagation optical system according to Numerical Example 1.

FIG. 5 is a set of aberration diagrams (i.e., longitudinal spherical aberration (spherical aberration), astigmatism field curves (astigmatism), and distortion) of the propagation optical system 20 according to Numerical Example 1. The spherical aberration diagram of FIG. 5 is spherical aberrations at the d line and the g line (435.84 nm). The solid line indicates the spherical aberration at the d line, and the dotted line indicates the spherical aberration at the g line. The astigmatism diagram of FIG. 5 is the astigmatism at the d line (i.e., the difference between the sagittal image plane and the meridional image plane). The solid line indicates aberration in the sagittal direction, and the broken line indicates aberration in the meridional direction. In the spherical aberration diagram and the astigmatism diagram, the vertical axis represents the image height, and the horizontal axis represents the amount of the aberration. In the distortion diagram of FIG. 5, the vertical axis represents the image height, and the horizontal axis represents the distortion curvature at the d line.

Figure 6:
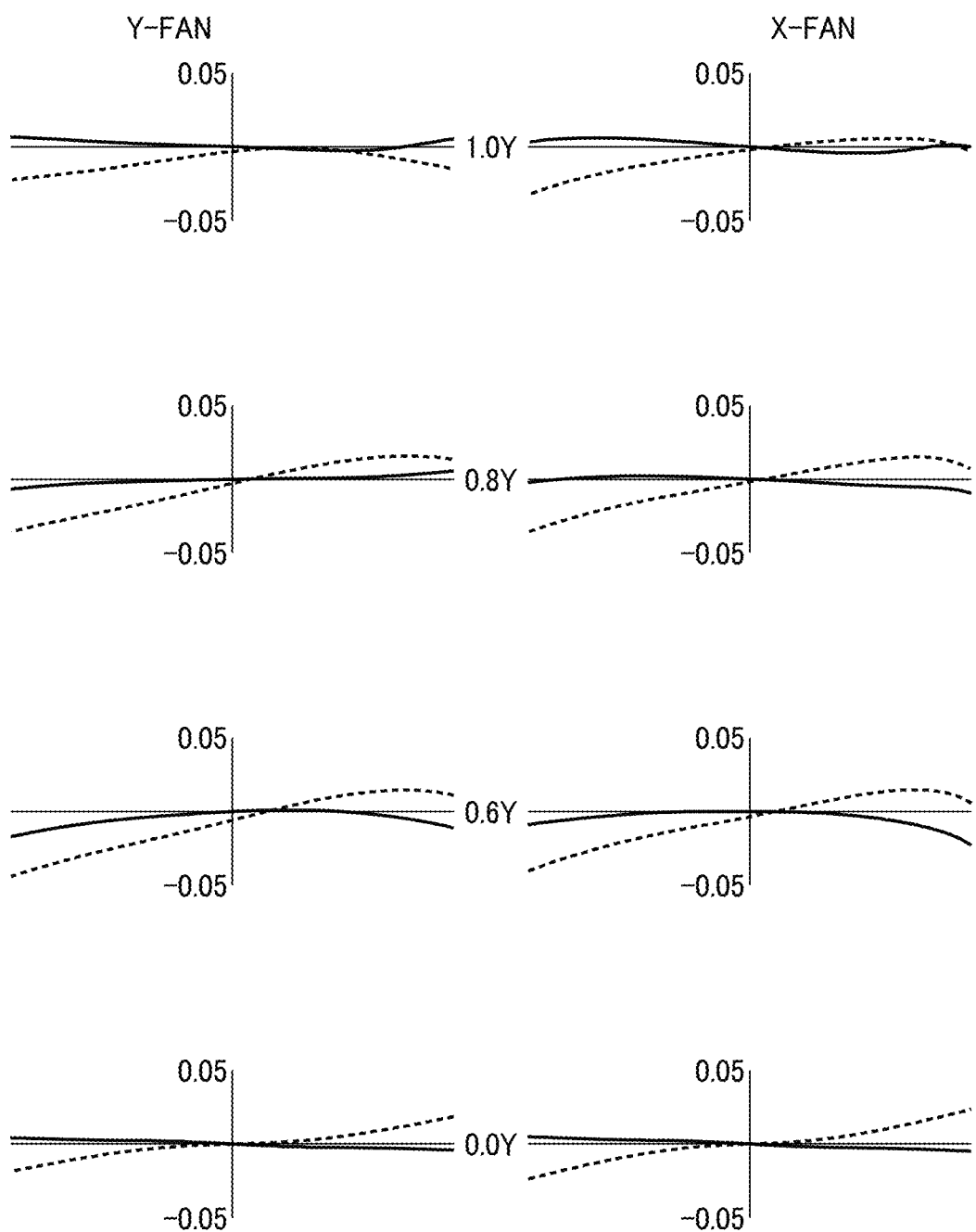
FIG. 6 is a set of aberration diagrams of lateral aberration of the propagation optical system according to Numerical Example 1.

FIG. 6 is a set of lateral aberration diagrams of the propagation optical system 20 according to Numerical Example 1. The lateral aberration diagrams illustrate lateral aberrations at the d line and the g line at each image height. The solid line indicates the lateral aberration at the d line, and the dotted line indicates the lateral aberration at the g line. The lateral aberration is measured in the X-direction and Y-direction. In FIG. 6, the left diagrams ("Y-FAN") illustrates lateral aberration in the Y-direction, and the right diagram ("X-FAN") illustrates lateral aberration in the X-direction.

As described below, in Numerical Example 1, all of the conditional expressions (1) to (10) are satisfied.

SAG/H: −0.21 (see the conditional expressions (1) and (2))
DP/LY: 1.35 (see the conditional expression (3))
DP/DL: 1.13 (see the conditional expressions (4) and (5))
fn/f1: −1.35 (see the conditional expressions (6) and (7))
fn/f2: −1.25 (see the
conditional expressions (8) and (9))
θ: 90° (see the conditional expression (10))

In the propagation optical system 20 according to Numerical Example 1, various aberrations are preferably corrected (see FIGS. 5 and 6), a wide angle of view (i.e., an angle of view exceeding 40 degrees in a diagonal direction) is achieved, and preferable image performance is achieved. In addition, the propagation optical system 20 according to Numerical Example 1 has various advantages by satisfying the conditional expressions (1) to (10).

Numerical Example 2

Figure 7:
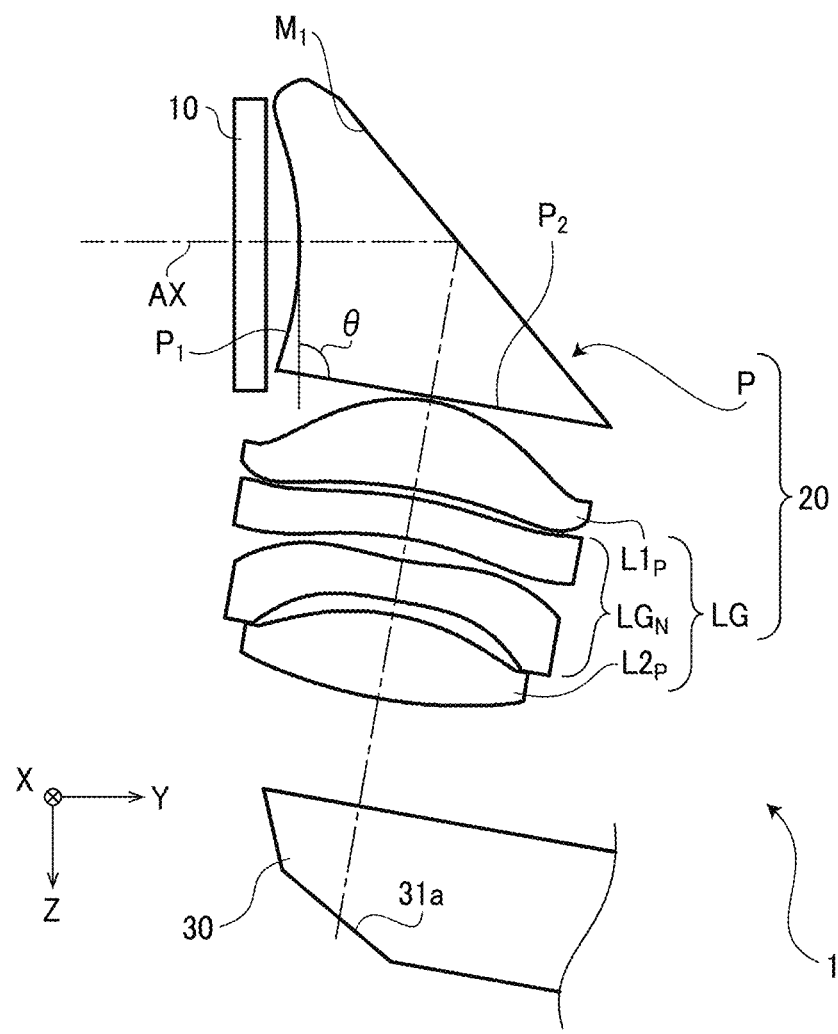
FIG. 7 is a diagram of an optical configuration of a propagation optical system according to Numerical Example 2.

FIG. 7 is a diagram of an optical configuration of a propagation optical system 20 according to Numerical

TABLE 2

| | K | A4 | A6 | A8 | A10 |
|---|---|---|---|---|---|
| 3 | 0.000 | −7.22500E−03 | 1.63236E−03 | −1.85308E−04 | 9.70352E−06 |
| 7 | −0.479 | 2.33318E−03 | −1.08187E−04 | 2.17992E−05 | 7.36575E−07 |
| 8 | 0.000 | 2.70653E−03 | −6.79792E−04 | 6.85191E−05 | −1.06734E−06 |
| 9 | 0.000 | 3.38326E−03 | 1.94830E−06 | −8.91793E−06 | 5.97533E−07 |
| 10 | 0.000 | −9.36359E−04 | 5.63706E−04 | −2.51339E−05 | 1.75457E−07 |
| 11 | 0.000 | −1.49864E−02 | 6.59726E−04 | −3.44970E−07 | −5.65301E−07 |
| 12 | 0.000 | −1.59372E−02 | 8.35961E−04 | −1.59072E−05 | −3.70907E−07 |
| 13 | 0.000 | −4.23719E−03 | 6.42318E−04 | −3.48749E−05 | 1.58446E−06 |
| 14 | 2.414 | −1.32590E−03 | 1.09229E−04 | −2.87377E−05 | 3.03172E−06 |

Example 2 of the present invention. As illustrated in FIG. 7, the optical configuration of the propagation optical system 20 according to Numerical Example 2 is the same as the optical configuration of the propagation optical system 20 according to Numerical Example 1.

A specific numerical configuration of the propagation optical system 20 according to Numerical Example 2 is listed in Table 3. Herein, a number 0 in Table 1 indicates an image display surface (i.e., pixel array surface) of the image display element 10. Numbers 1 and 2 in Table 1 indicate surfaces of a cover glass included in the image display element 10. Numbers 3 to 6 in Table 1 indicate surfaces of the prisms P. Numbers 7 to 14 in Table 1 indicate surfaces of the lens groups LG. Numbers 15 to 17 in Table 1 indicate surfaces of the light guide elements 30. Table 4 is a list of data of the aspheric surfaces of Numerical Example 2.

TABLE 3

| | R | D | Nd | vd | | |
|---|---|---|---|---|---|---|
| 0 | | 0.00 | | | | |
| 1 | ∞ | 0.70 | 1.51633 | 64.14 | | S-BSL7 (OHARA) |
| 2 | ∞ | 0.74 | | | | |
| 3* | −9.076 | 0.20 | 1.53100 | 56 | | E48R<ZEON> |
| 4 | ∞ | 3.33 | 1.53100 | 56 | | E48R<ZEON> |
| 5 | ∞ | −3.33 | 1.53100 | 56 | reflection surface | E48R<ZEON> |
| 6 | ∞ | −0.20 | | | | |
| 7* | −3.401 | −1.97 | 1.53100 | 56 | | E48R<ZEON> |
| 8* | −10.308 | −0.20 | | | | |
| 9* | −9.181 | −0.90 | 1.63200 | 23 | | OKP4HT(Osaka Gas Chemicals) |
| 10* | −8.112 | −0.49 | | | | |
| 11* | 8.185 | −0.90 | 1.63200 | 23 | | OKP4HT(Osaka Gas Chemicals) |
| 12* | −45.685 | −0.31 | | | | |
| 13* | −5.744 | −1.87 | 1.53100 | 56 | | E48R<ZEON> |
| 14* | 10.493 | −2.41 | | | | |
| 15 | ∞ | −2.50 | 1.53100 | 56 | | E48R<ZEON> |
| 16 | ∞ | 40.00 | 1.53100 | 56 | reflection surface | E48R<ZEON> |
| 17 | ∞ | | | | | |

TABLE 4

| | K | A4 | A6 | A8 | A10 |
|---|---|---|---|---|---|
| 3 | 0.000 | −7.22500E−03 | 1.63236E−03 | −1.85308E−04 | 9.70352E−06 |
| 7 | −0.432 | 2.06120E−03 | −9.47981E−05 | 1.66334E−05 | 4.75536E−07 |
| 8 | 0.000 | 2.83483E−03 | −6.88240E−04 | 6.71537E−05 | −1.30766E−06 |
| 9 | 0.000 | 3.10423E−03 | 5.10299E−06 | −8.36927E−06 | 7.17060E−07 |
| 10 | 0.000 | −8.41433E−04 | 5.49936E−06 | −2.54690E−05 | 3.48044E−07 |
| 11 | 0.000 | −1.53100E−02 | 6.47798E−04 | −1.24491E−06 | −7.39231E−07 |
| 12 | 0.000 | −1.65665E−02 | 7.39132E−04 | −1.66701E−05 | −2.03975E−07 |
| 13 | 0.000 | −3.21299E−03 | 6.83154E−04 | −4.19542E−05 | 1.34518E−06 |
| 14 | 2.559 | −1.12778E−03 | 1.64630E−04 | −2.38108E−05 | 1.50396E−06 |

Figure 8:
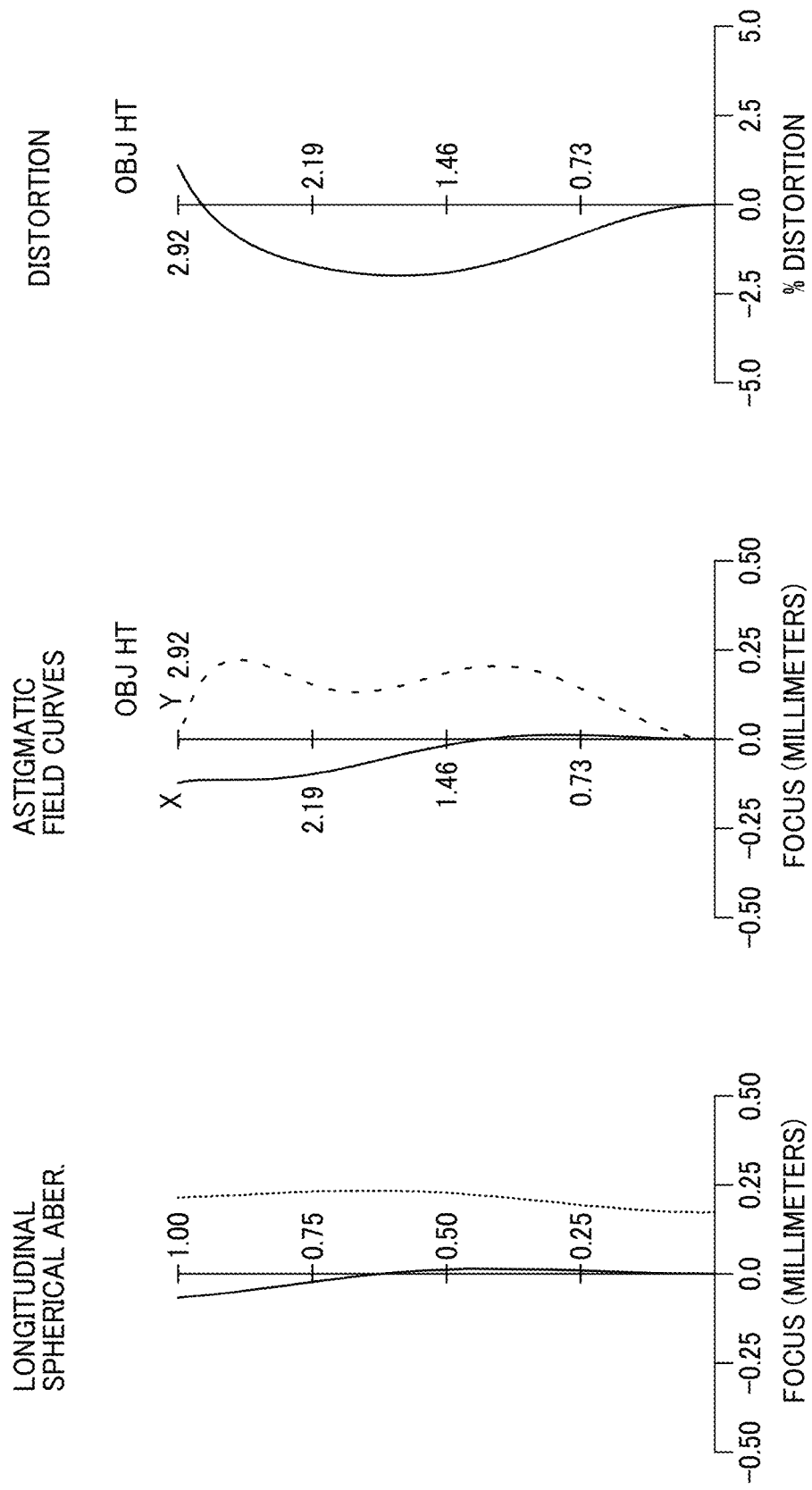
FIG. 8 is a set of aberration diagrams of spherical aberration, astigmatism, and distortion of the propagation optical system according to Numerical Example 2.
Figure 9:
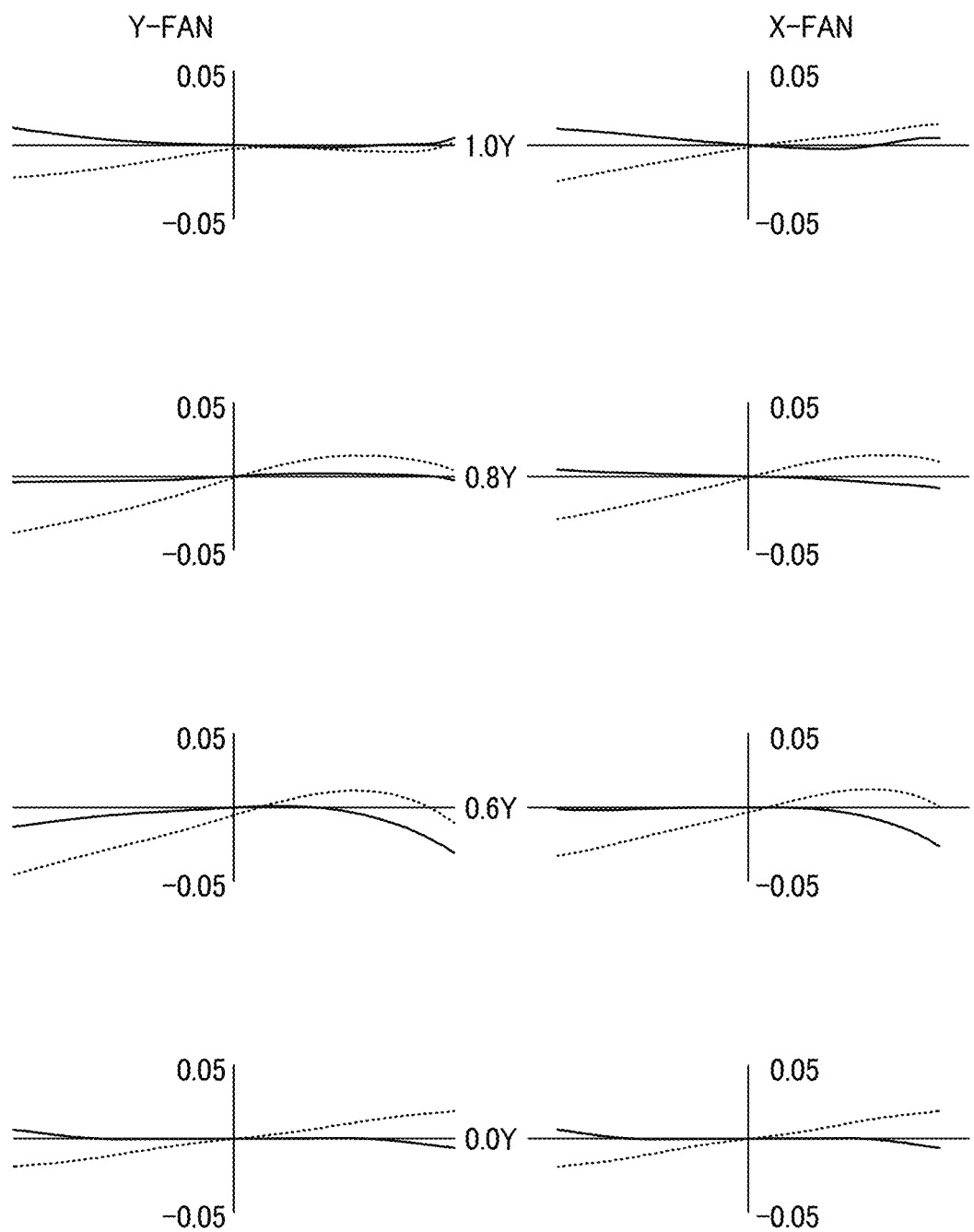
FIG. 9 is a set of lateral aberration diagrams of the propagation optical system according to Numerical Example 2.

FIG. 8 is a set of aberration diagrams (i.e., spherical aberration, astigmatism, and distortion) of the propagation optical system 20 according to Numerical Example 2. FIG. 9 is a set of lateral aberration diagrams of the propagation optical system 20 according to Numerical Example 2.

As described below, all of the conditional expressions (1) to (10) are satisfied also in Numerical Example 2.
SAG/H: −0.18 (see the conditional expressions (1) and (2))
DP/LY: 1.36 (see the conditional expression (3))
DP/DL: 1.02 (see the conditional expressions (4) and (5))
fn/f1: −1.22 (see the conditional expressions (6) and (7))
fn/f2: −1.45 (see the conditional expressions (8) and (9))
θ: 100° (see the conditional expression (10))

In the propagation optical system 20 according to Numerical Example 2, various aberrations are preferably corrected (see FIGS. 8 and 9), a wide angle of view (i.e., an angle of view exceeding 40 degrees in the diagonal direction) is secured, and preferable image performance is achieved. In addition, the propagation optical system 20 according to Numerical Example 2 has various advantages by satisfying the conditional expressions (1) to (10).

Numerical Example 3

Figure 10:
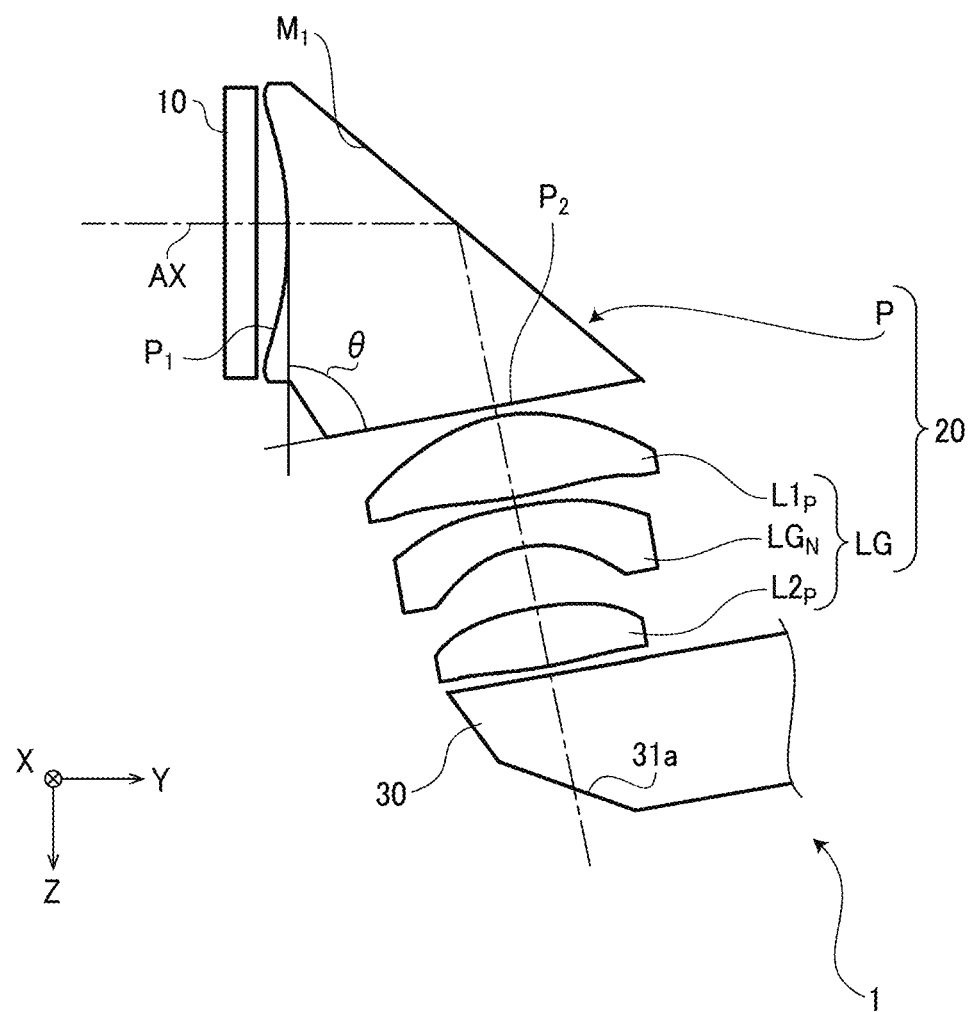
FIG. 10 is a diagram of a configuration of a propagation optical system according to Numerical Example 3.

FIG. 10 is a diagram of an optical configuration of a propagation optical system 20 according to Numerical Example 3 of the present invention. As illustrated in FIG. 10, the optical configuration of the propagation optical system 20 according to Numerical Example 3 is the same as the optical configuration of the propagation optical system 20 according to Numerical Example 1 except that the negative lens group $LG_N$ is formed of one lens.

A specific numerical configuration of the propagation optical system 20 according to Numerical Example 3 is listed in Table 5. Herein, a number 0 in Table 1 indicates an image display surface (i.e., pixel array surface) of the image display element 10. Numbers 1 and 2 in Table 1 indicate surfaces of a cover glass included in the image display element 10. Numbers 3 to 6 in Table 1 indicate surfaces of the prisms P. Numbers 7 to 12 in Table 5 indicate surfaces the lens groups LG. Numbers 13 to 15 in Table 5 indicate surfaces the light guide elements 30. Table 6 is a list of data of the aspheric surfaces of Numerical Example 3.

TABLE 5

| | R | D | Nd | vd | | |
|---|---|---|---|---|---|---|
| 0 | | 0.00 | | | | |
| 1 | ∞ | 0.70 | 1.51633 | 64.14 | | S-BSL7 (OHARA) |
| 2 | ∞ | 0.69 | | | | |
| 3* | −12.167 | 0.07 | 1.53100 | 56 | | E48R<ZEON> |
| 4 | ∞ | 3.91 | 1.53100 | 56 | | E48R<ZEON> |

TABLE 5-continued

| | R | D | Nd | vd | | |
|---|---|---|---|---|---|---|
| 5 | ∞ | −3.91 | 1.53100 | 56 | reflection surface | E48R<ZEON> |
| 6 | ∞ | −0.20 | | | | |
| 7* | −3.633 | −1.82 | 1.53100 | 56 | | E48R<ZEON> |
| 8* | 10.186 | −0.21 | | | | |
| 9* | −14.687 | −0.90 | 1.63200 | 23 | | OKP4HT(Osaka Gas Chemicals) |
| 10* | −2.748 | −1.36 | | | | |
| 11* | −7.922 | −1.32 | 1.53100 | 56 | | E48R<ZEON> |
| 12* | 11.014 | −0.20 | | | | |
| 13 | ∞ | −2.50 | 1.53100 | 56 | | E48R<ZEON> |

TABLE 5-continued

|    | R | D     | Nd     | vd |                    |            |
|----|---|-------|--------|----|--------------------|------------|
| 14 | ∞ | 40.00 | 1.53100| 56 | reflection surface | E48R<ZEON> |
| 15 | ∞ |       |        |    |                    |            |

TABLE 6

|    | K     | A4          | A6          | A8          | A10         |
|----|-------|-------------|-------------|-------------|-------------|
| 3  | 0.000 | −1.33122E−02| 3.27756E−03 | −3.81150E−04| 1.79355E−05 |
| 7  | 0.000 | 3.93806E−03 | 4.65968E−04 | −7.54827E−05| 4.48743E−06 |
| 8  | 0.000 | −7.41240E−03| 4.06446E−04 | −6.89203E−05| 4.20058E−06 |
| 9  | 0.000 | −1.00229E−02| 3.09027E−04 | 1.24355E−06 | 9.67164E−07 |
| 10 | 0.000 | −5.96071E−03| 9.89743E−04 | 9.20465E−05 | 1.40364E−05 |
| 11 | 0.000 | −7.93110E−03| −2.23266E−04| −2.32526E−05| −7.01616E−06|
| 12 | 0.000 | −4.21422E−03| −2.14825E−04| −8.60067E−05| −1.27931E−05|

Figure 11:
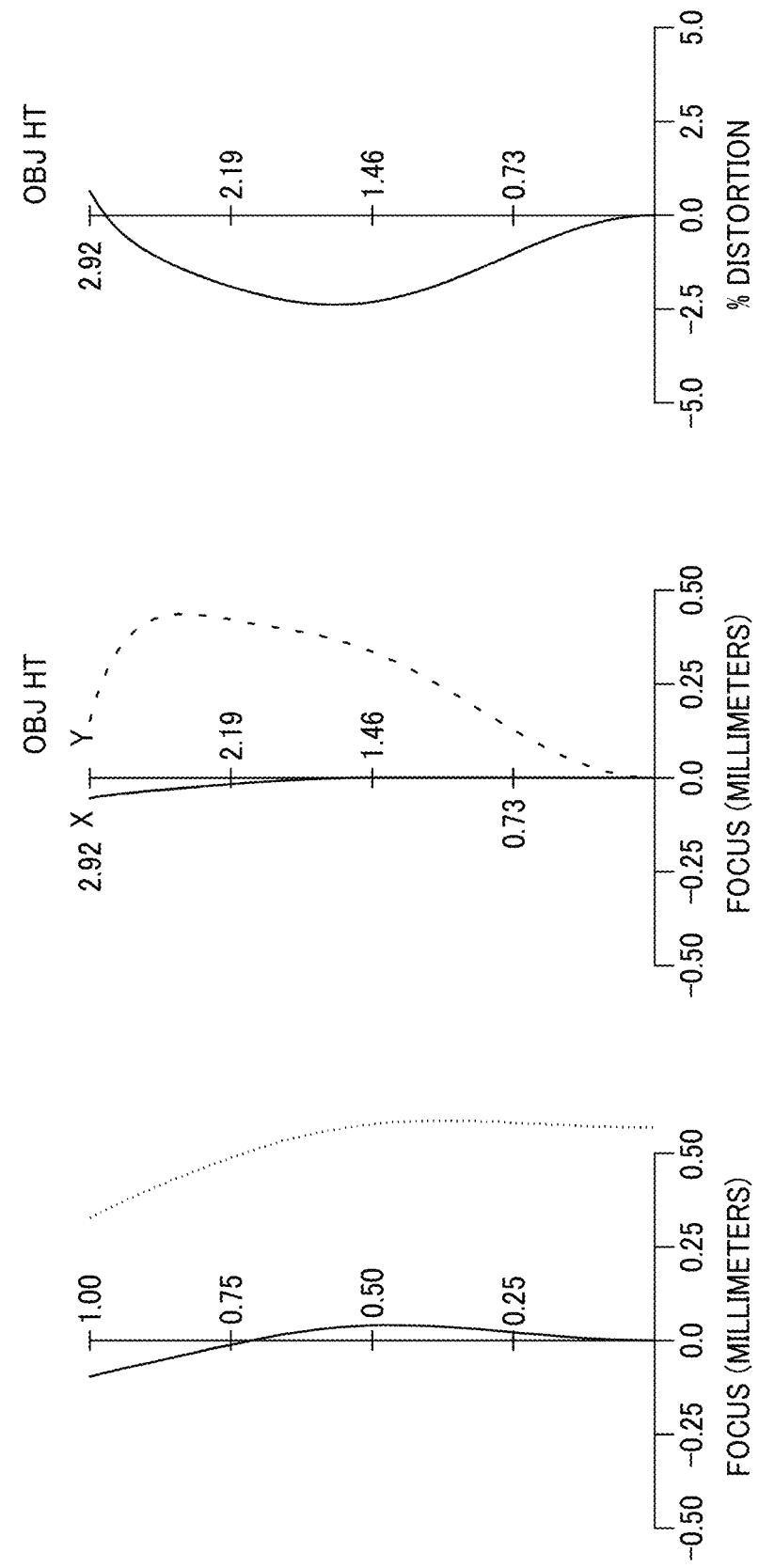
FIG. 11 is a set of aberration diagrams of spherical aberration, astigmatism, and distortion of the propagation optical system according to Numerical Example 3.
Figure 12:
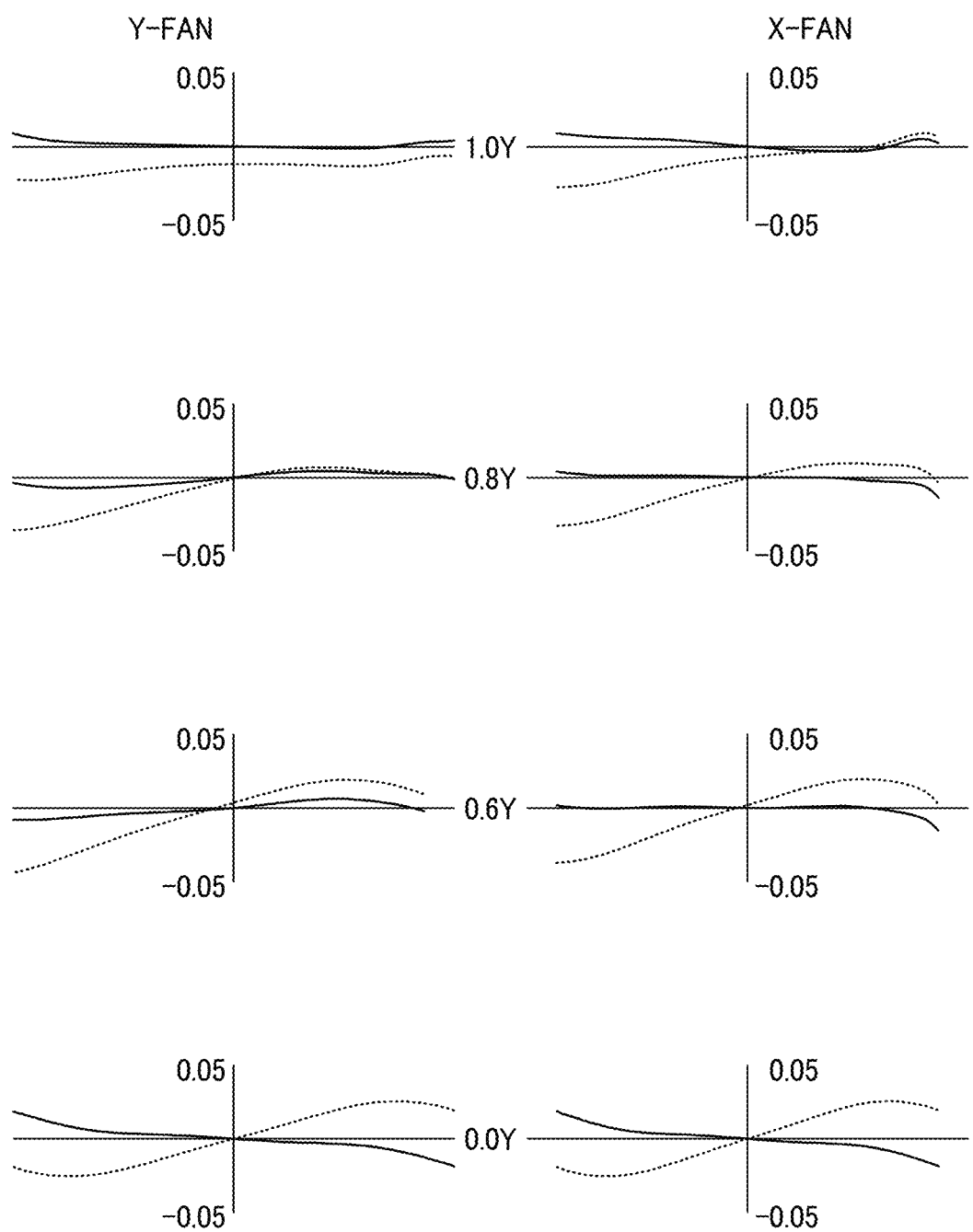
FIG. 12 is a set of lateral aberration diagrams of the propagation optical system according to Numerical Example 3.

FIG. 11 is a set of aberration diagrams (i.e., spherical aberration, astigmatism, and distortion) of the propagation optical system 20 according to Numerical Example 3. FIG. 12 is a set of lateral aberration diagrams of the propagation optical system 20 according to Numerical Example 3.

As described below, all of conditional expressions (1) to (10) are satisfied also in Numerical Example 3.

SAG/H: −0.17 (see the conditional expressions (1) and (2))
DP/LY: 1.58 (see the conditional expression (3))
DP/DL: 1.40 (see the conditional expressions (4) and (5))
fn/f1: −1.04 (see the conditional expressions (6) and (7))
fn/f2: −0.62 (see the conditional expressions (8) and (9))
θ: 80° (see the conditional expression (10))

Also in the propagation optical system 20 according to Numerical Example 3, various aberrations are preferably corrected (see FIGS. 11 and 12), a wide angle of view (i.e., an angle of view exceeding 40 degrees in the diagonal direction) is secured, and preferable image performance is achieved. In addition, the propagation optical system 20 according to Numerical Example 3 has various advantages by satisfying the conditional expressions (1) to (10).

Numerical Example 4

Figure 13:
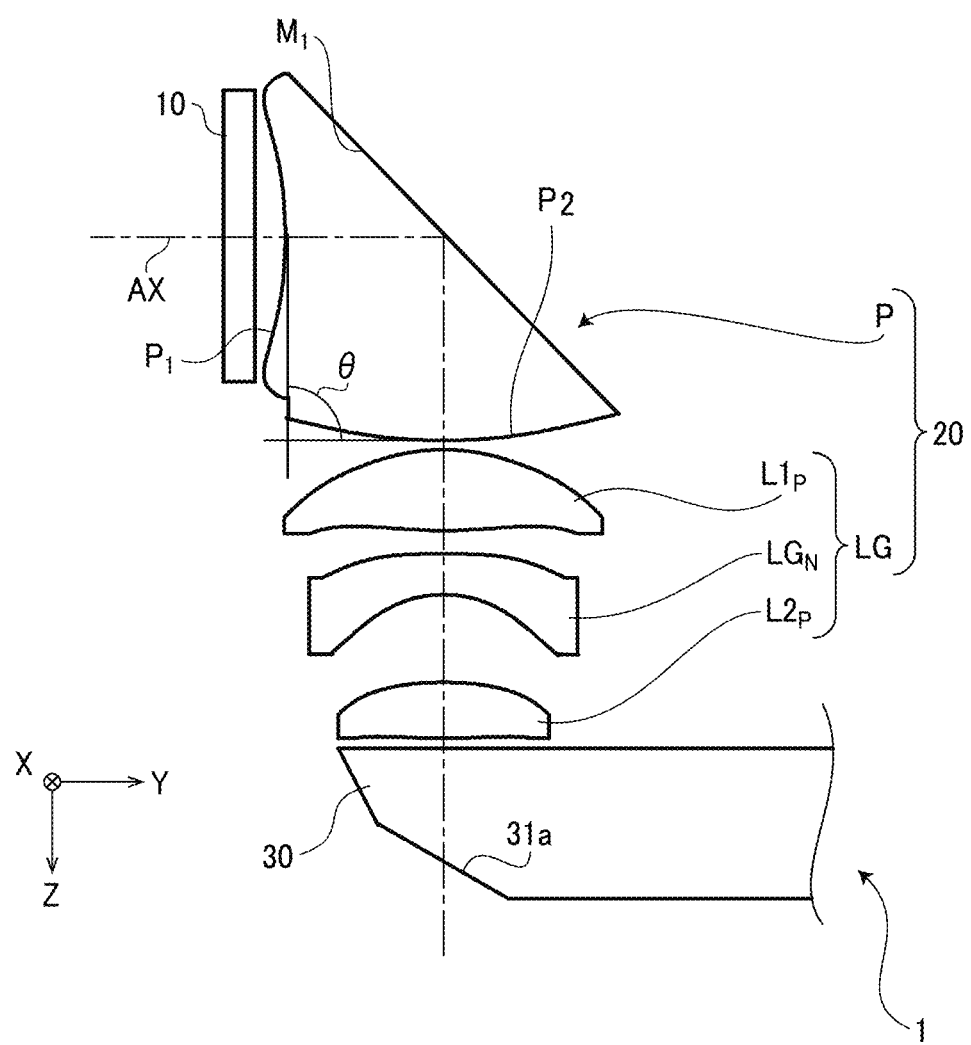
FIG. 13 is a diagram of an optical configuration of a propagation optical system according to Numerical Example 4.

FIG. 13 is a diagram of an optical configuration of a propagation optical system 20 according to Numerical Example 4 according to the present invention. As illustrated in FIG. 13, the optical configuration of the propagation optical system 20 according to Numerical Example 4 is the same as the optical configuration of the propagation optical system 20 according to Numerical Example 1 except that the negative lens group $LG_N$ includes one lens.

A specific numerical configuration of the propagation optical system 20 according to Numerical Example 4 is listed in Table 7. Herein, a number 0 in Table 1 indicates an image display surface (i.e., pixel array surface) of the image display element 10. Numbers 1 and 2 in Table 1 indicate surfaces of a cover glass included in the image display element 10. Numbers 3 to 7 in Table 7 indicate surfaces of the prisms P. Numbers 8 to 13 in Table 7 indicate surfaces of the lens groups LG. Numbers 14 to 16 in Table 7 indicate surfaces of the light guide elements 30. Table 8 is a list of data of the aspheric surfaces of Numerical Example 4.

TABLE 7

|     | R       | D     | Nd      | vd    |            |                     |
|-----|---------|-------|---------|-------|------------|---------------------|
| 0   |         | 0.00  |         |       |            |                     |
| 1   | ∞       | 0.70  | 1.51633 | 64.14 |            | S-BSL7 (OHARA)      |
| 2   | ∞       | 0.66  |         |       |            |                     |
| 3*  | −12.913 | 0.07  | 1.53100 | 56    |            | E48R<ZEON>          |
| 4   | ∞       | 3.42  | 1.53100 | 56    |            | E48R<ZEON>          |
| 5   | ∞       | −3.42 | 1.53100 | 56    | reflection surface | E48R<ZEON>  |
| 6   | ∞       | −1.07 | 1.53100 | 56    |            | E48R<ZEON>          |
| 7*  | 12.028  | −0.20 |         |       |            |                     |
| 8*  | −4.238  | −1.78 | 1.53100 | 56    |            | E48R<ZEON>          |
| 9*  | 10.358  | −0.51 |         |       |            |                     |
| 10* | −21.120 | −0.90 | 1.63200 | 23    |            | OKP4HT(Osaka Gas Chemicals) |
| 11* | −2.547  | −1.93 |         |       |            |                     |
| 12* | −6.717  | −1.24 | 1.53100 | 56    |            | E48R<ZEON>          |
| 13* | 15.362  | −0.20 |         |       |            |                     |
| 14  | ∞       | −2.50 | 1.53100 | 56    |            | E48R<ZEON>          |
| 15  | ∞       | 40.00 | 1.53100 | 56    | reflection surface | E48R<ZEON>  |
| 16  | ∞       |       |         |       |            |                     |

TABLE 8

|    | K     | A4          | A6          | A8          | A10         |
|----|-------|-------------|-------------|-------------|-------------|
| 3  | 0.000 | −1.33122E−02| 3.27756E−03 | −3.81150E−04| 1.79355E−05 |
| 7  | 0.000 | 3.93806E−03 | 4.65968E−04 | −7.54827E−05| 4.48743E−06 |
| 8  | 0.000 | −7.41240E−03| 4.06446E−04 | −6.89203E−05| 4.20058E−06 |
| 9  | 0.000 | −1.00229E−02| 3.09027E−04 | 1.24355E−05 | 9.67164E−07 |
| 10 | 0.000 | −5.96071E−03| 9.89743E−04 | 9.20465E−05 | 1.40364E−05 |
| 11 | 0.000 | −7.93110E−03| −2.23266E−04| −2.32526E−05| −7.01616E−06|
| 12 | 0.000 | −4.21422E−03| −2.14825E−04| −8.60067E−05| −1.27931E−05|

Figure 14:
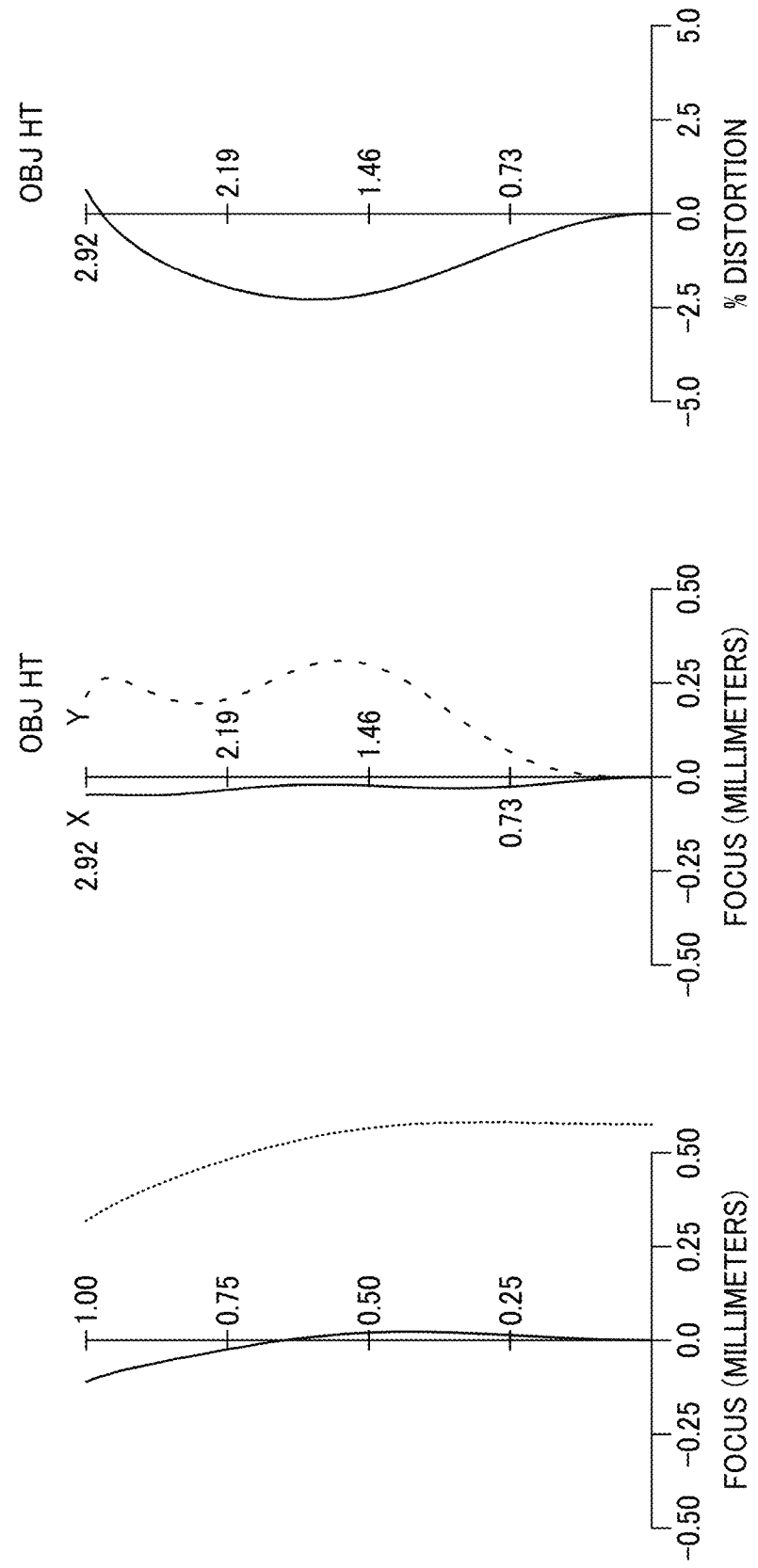
FIG. 14 is a set of aberration diagrams of spherical aberration, astigmatism, and distortion of a propagation optical system according to Numerical Example 4.
Figure 15:
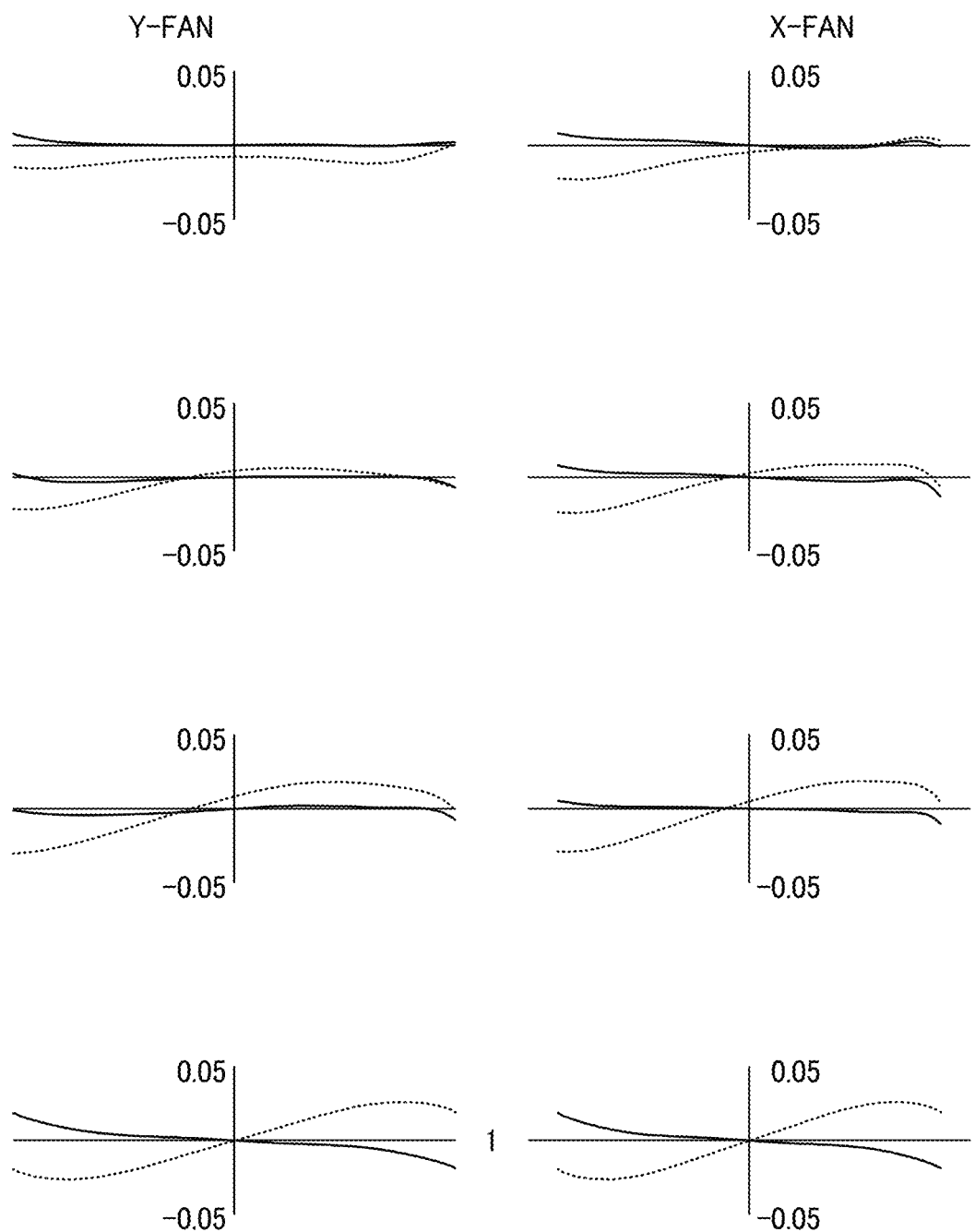
FIG. 15 is a set of lateral aberration diagrams of the propagation optical system according to Numerical Example 4.

FIG. 14 is a set of aberration diagrams (i.e., spherical aberration, astigmatism, and distortion) of the propagation optical system 20 according to Numerical Example 4. FIG. 15 is a set of lateral aberration diagrams of the propagation optical system 20 according to Numerical Example 4.

As described below, all of the conditional expressions (1) to (10) are satisfied also in Numerical Example 4.

SAG/H: −0.16 (see the conditional expressions (1) and (2))
DP/LY: 1.60 (see the conditional expression (3))
DP/DL: 1.26 (see the conditional expressions (4) and (5))
fn/f1: −0.79 (see the conditional expressions (6) and (7))
fn/f2: −0.52 (see the conditional expressions (8) and (9))
θ: 90° (see the conditional expression (10))

In the propagation optical system 20 according to Numerical Example 4, various aberrations are preferably corrected (see FIGS. 14 and 15), a wide angle of view (i.e., an angle of view exceeding 40 degrees in the diagonal direction) is secured, and preferable image performance is achieved. In addition, the propagation optical system 20 according to Numerical Example 4 has various advantages by satisfying the conditional expressions (1) to (10).

The above is a description of exemplary embodiments of the present invention. The embodiments of the present invention are not limited to those described above, and various modifications are possible within the scope of the technical idea of the present invention. For example, the embodiments of the present application also include contents obtained by appropriately combining the embodiments explicitly described in the specification or the obvious embodiments.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A propagation optical system to propagate light from an image display element to a light guide element, the propagation optical system consisting of:
   a prism having a first surface having negative power to which light emitted from the image display element enters; and
   a lens group having positive power,
   wherein the prism and the lens group are arranged between the image display element and the light guide element along an optical axis, and the prism is closer to the image display element than to the light guide element such that the prism and the lens group having positive power are in this order from the image display element to the light guide element,
   wherein the lens group consists of, from a side of the image display element to a side of the light guide element:
   a first positive lens having positive power;
   a negative lens group consisting of one lens having negative power or two lenses each having negative power, the negative lens group having a negative power; and
   a second positive lens having positive power.

2. The propagation optical system according to claim 1, wherein the first surface of the prism is an aspherical surface.

3. The propagation optical system according to claim 1, wherein a conditional expression below is satisfied:

−0.4<SAG/H<−0.05 where H is an effective height of the first surface, and SAG is an amount of a sag of the first surface having the effective height H, and
   wherein SAG is a negative value when the first surface is a concave surface.

4. The propagation optical system according to claim 1, wherein the prism has a second surface from which the light emitted from the image display element and entered the first surface exits, and a conditional expression below is satisfied:

1.0<DP/LY<2.0 where DP is a distance between the first surface and the second surface along the optical axis, and LY is a length of the longest side of an effective pixel area of the image display element.

5. The propagation optical system according to claim 1, wherein the prism has a second surface from which the light emitted from the image display element and entered the first surface exits, and a conditional expression below is satisfied:

0.5<DP/DL<2.0 where DP is a distance between the first surface and the second surface along the optical axis, DL is a distance between a lens surface closest to the image display element and a lens surface closest to the light guide element among surfaces of the lens group along the optical axis.

6. The propagation optical system according to claim 1, wherein a conditional expression below is satisfied:

−2.0<fn/f1<−0.3 where f1 is a focal length of the first positive lens, and fn is a focal length of the negative lens group.

7. The propagation optical system according to claim 1, wherein a conditional expression below is satisfied:

−2.0<fn/f2<−0.3 where f2 is a focal length of the second positive lens, and fn is a focal length of the negative lens group.

8. The propagation optical system according to claim 1, wherein the prism has a second surface from which the light emitted from the image display element and entered the first surface exits, and a conditional expression below is satisfied:

70°<θ<110° where θ is an angle between the first surface and the second surface of the prism.

9. A virtual image display apparatus comprising:
   the propagation optical system according to claim 1 configured to propagate light emitted from the image display element to the light guide element;
   the image display element configured to emit light as an image; and
   the light guide element configured to guide the light propagated through the propagation optical system and emit the light as a virtual image.

10. A head-mounted display comprising:
    the virtual image display apparatus according to claim 9.

* * * * *